Oct. 20, 1964  A. J. STANTON ETAL  3,153,368
AMMUNITION TRANSFER MECHANISM
Filed June 3, 1957  22 Sheets-Sheet 1

INVENTORS
ARTHUR J. STANTON   RUSSELL T. SHAWEN
DAVID F. ANDERSON   JOHN B. KING

BY
ATTORNEYS

Oct. 20, 1964  A. J. STANTON ETAL  3,153,368
AMMUNITION TRANSFER MECHANISM
Filed June 3, 1957  22 Sheets-Sheet 2

INVENTORS
ARTHUR J. STANTON
DAVID F. ANDERSON
RUSSELL T. SHAWEN
JOHN B. KING
BY
ATTORNEYS

Oct. 20, 1964    A. J. STANTON ETAL    3,153,368
AMMUNITION TRANSFER MECHANISM
Filed June 3, 1957    22 Sheets-Sheet 3

INVENTORS
ARTHUR J. STANTON
DAVID F. ANDERSON
RUSSELL T. SHAWEN
JOHN B. KING

BY
G. H. O'Brien
Q. Baxter Warner.
ATTORNEYS

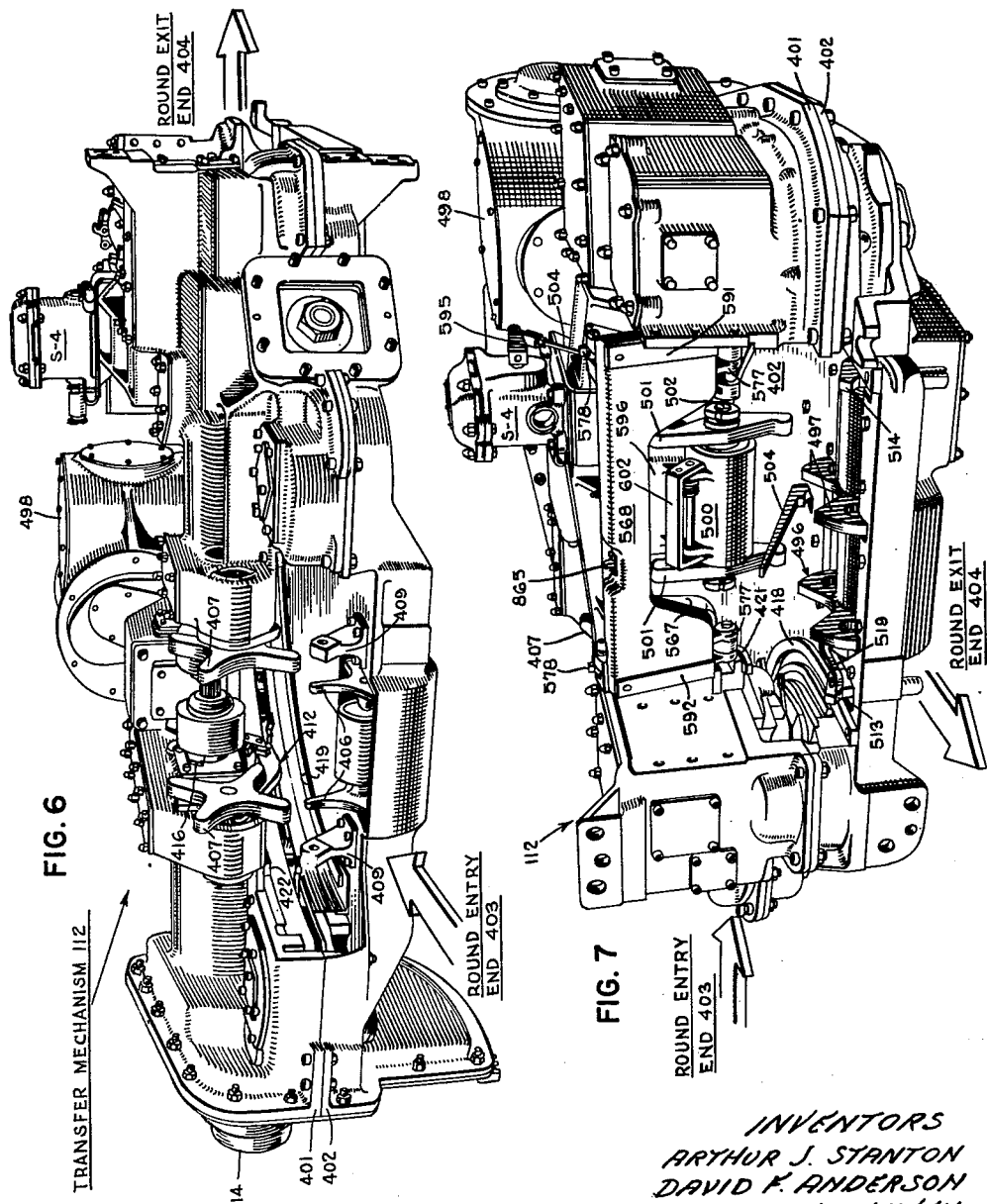

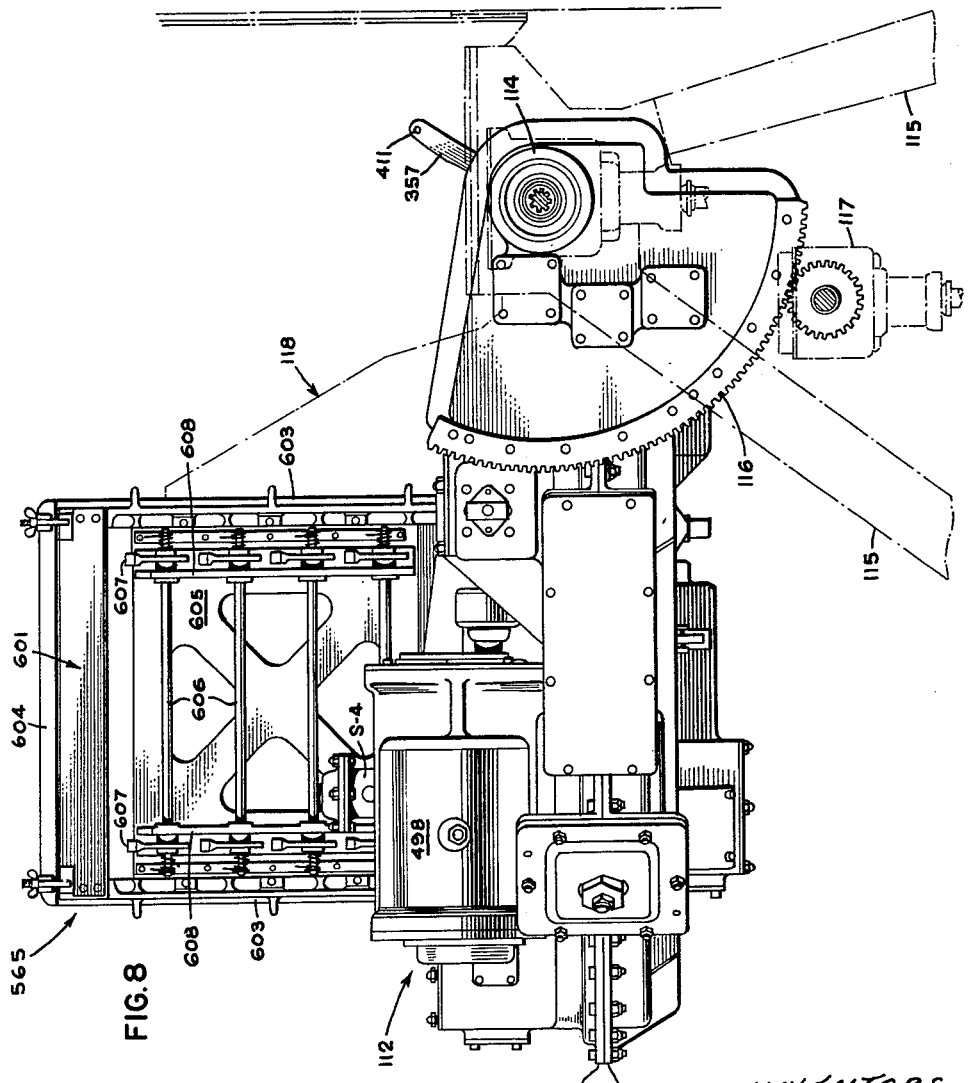

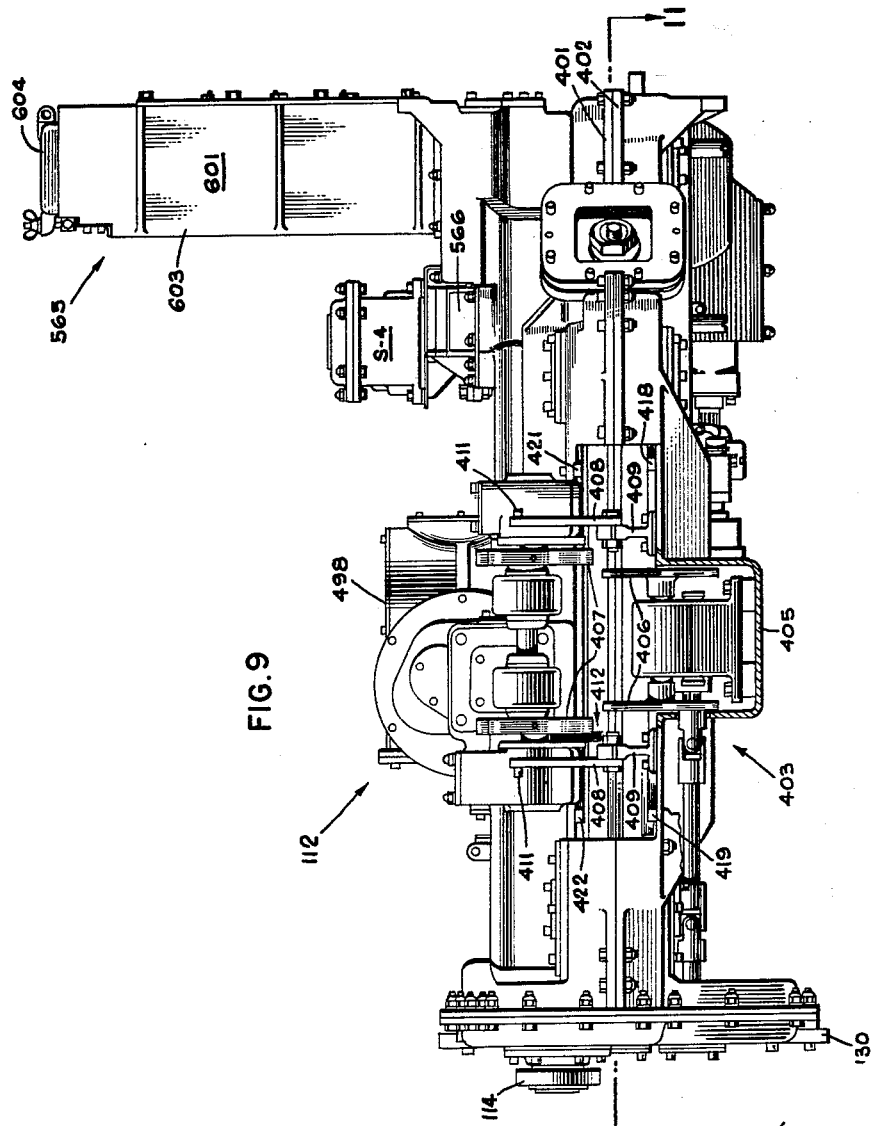

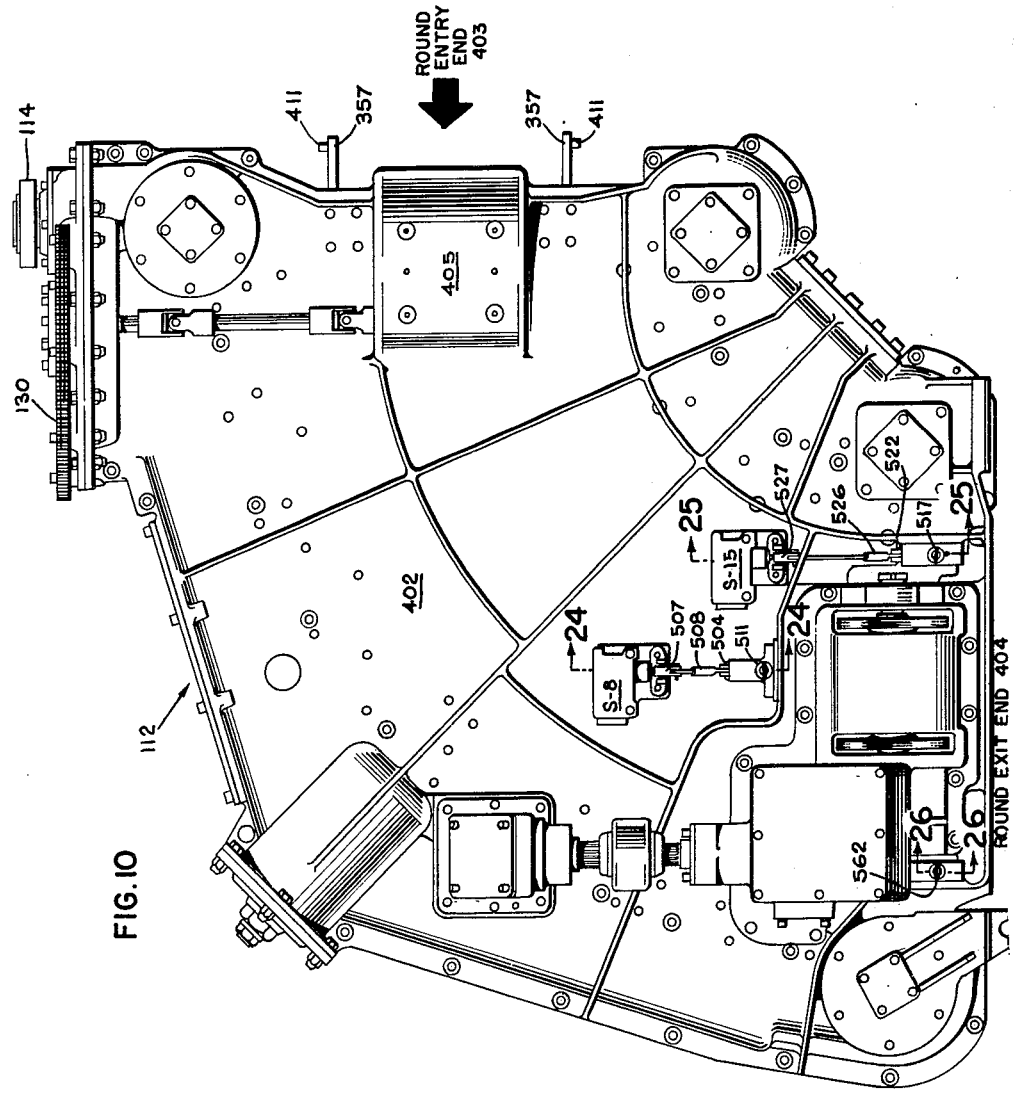

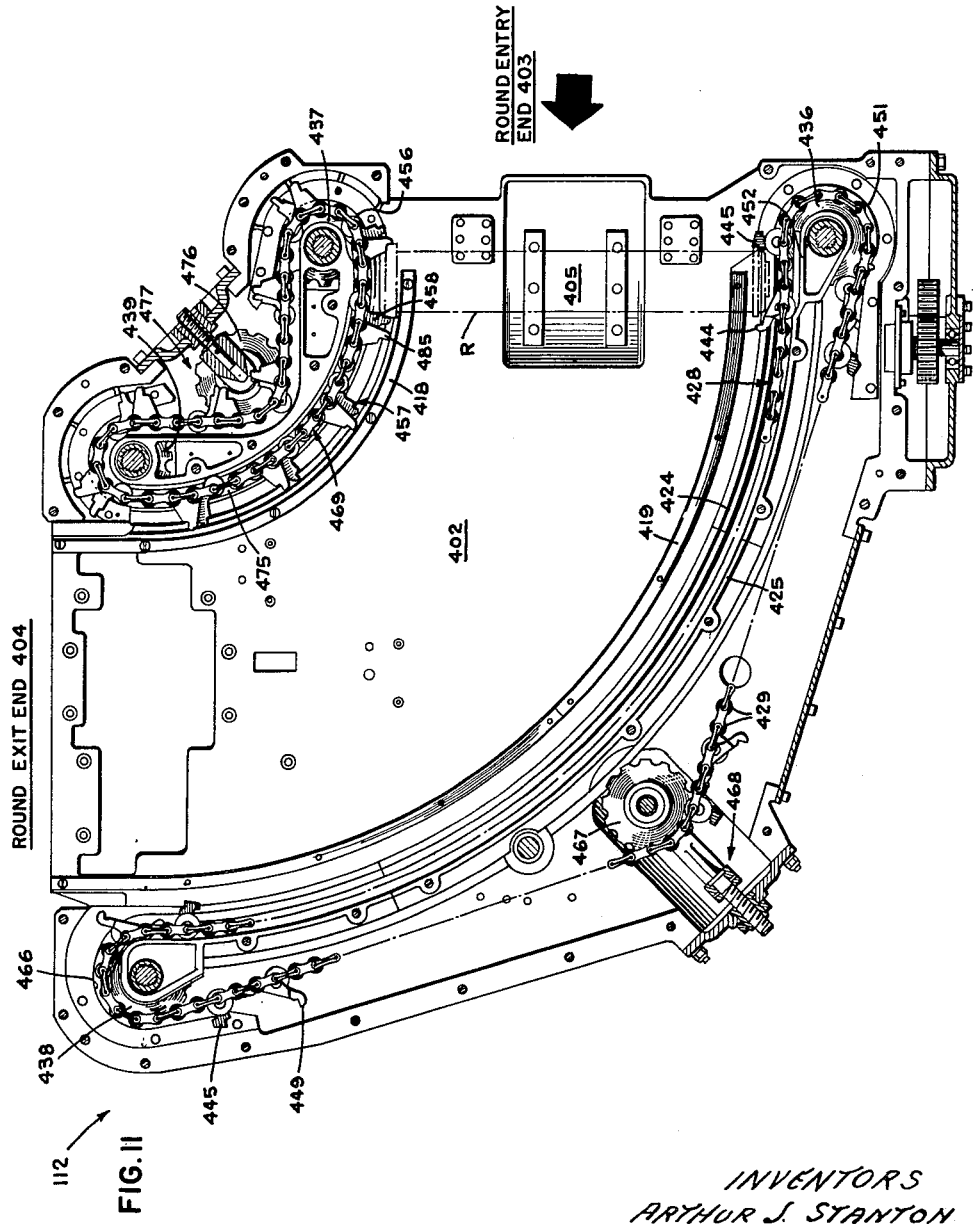

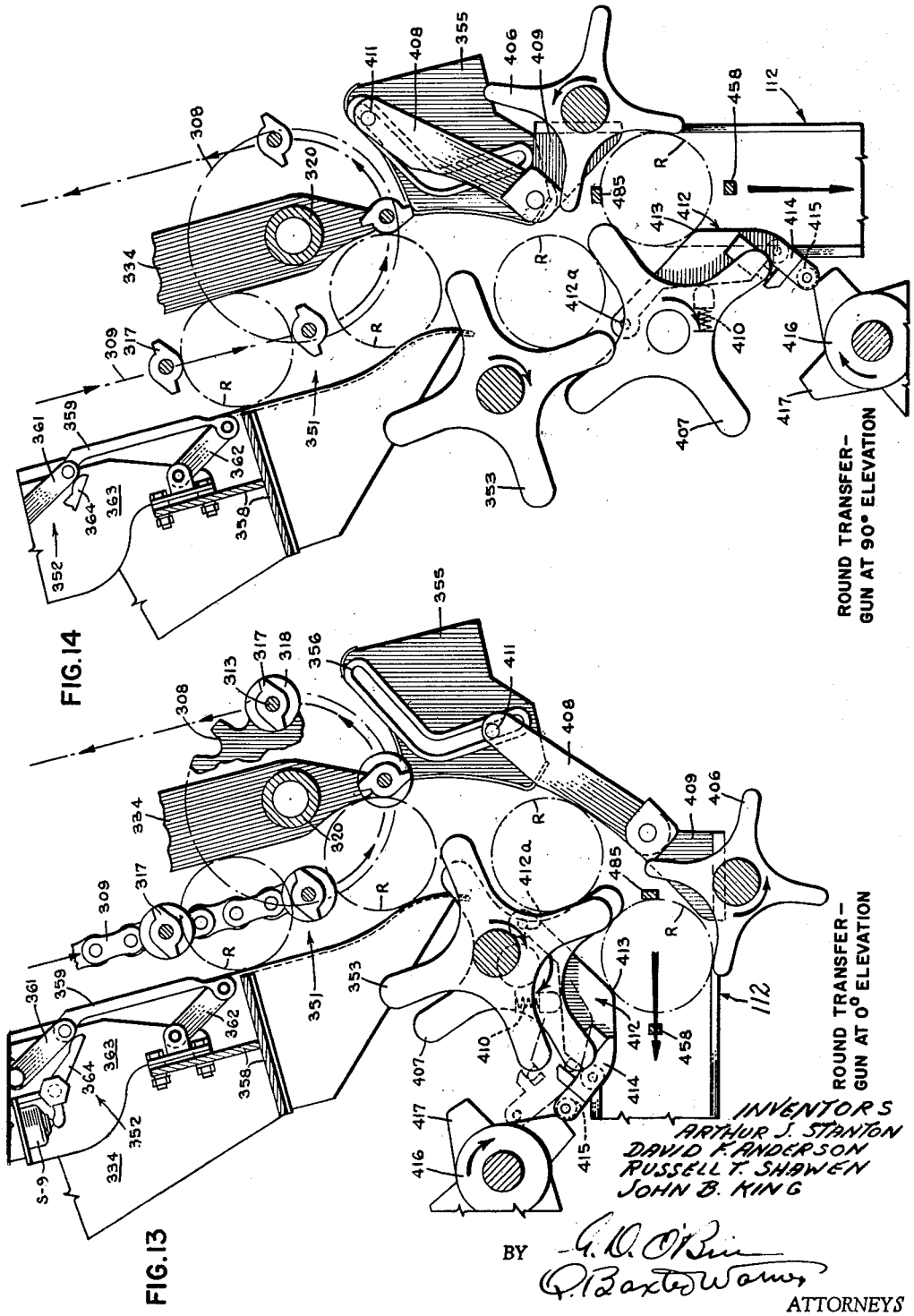

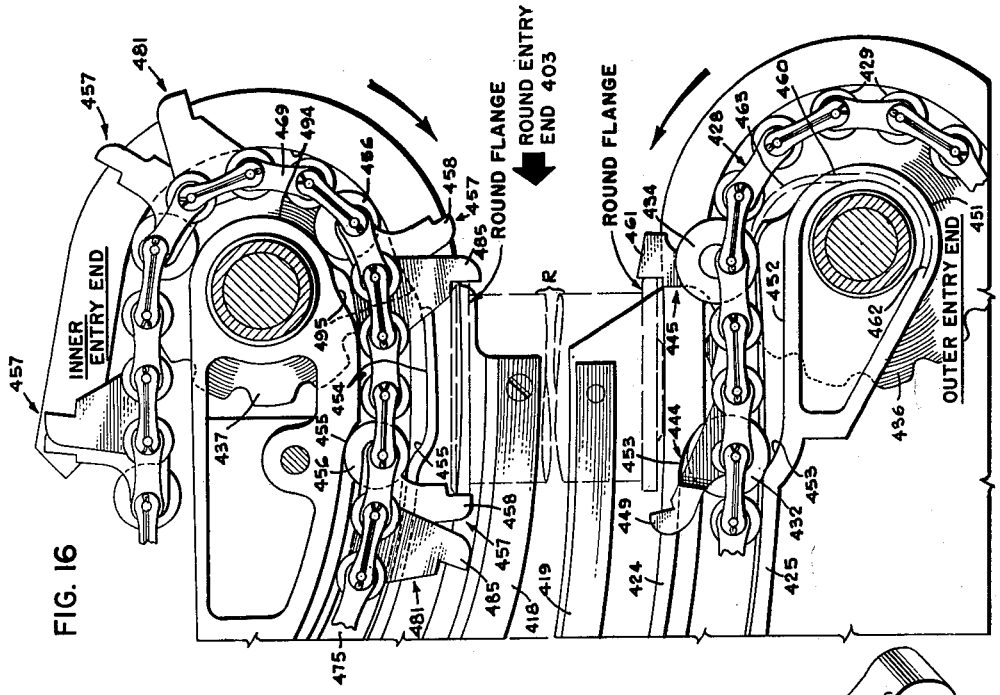
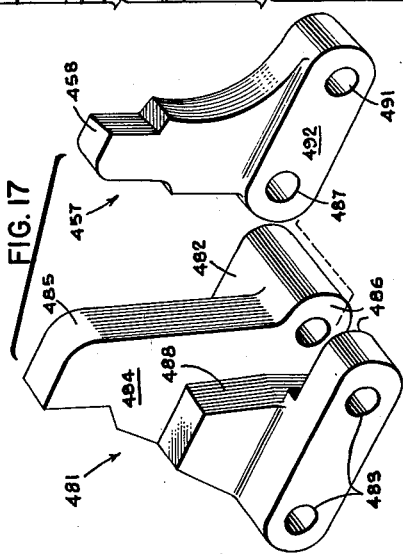
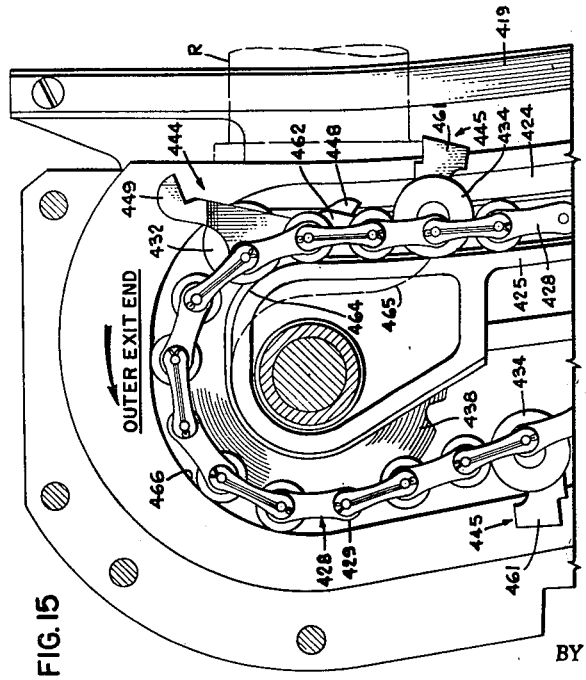
FIG. 16
FIG. 17
FIG. 15
INVENTORS
ARTHUR J. STANTON
DAVID F. ANDERSON
RUSSELL T. SHAWEN
JOHN B. KING
ATTORNEYS

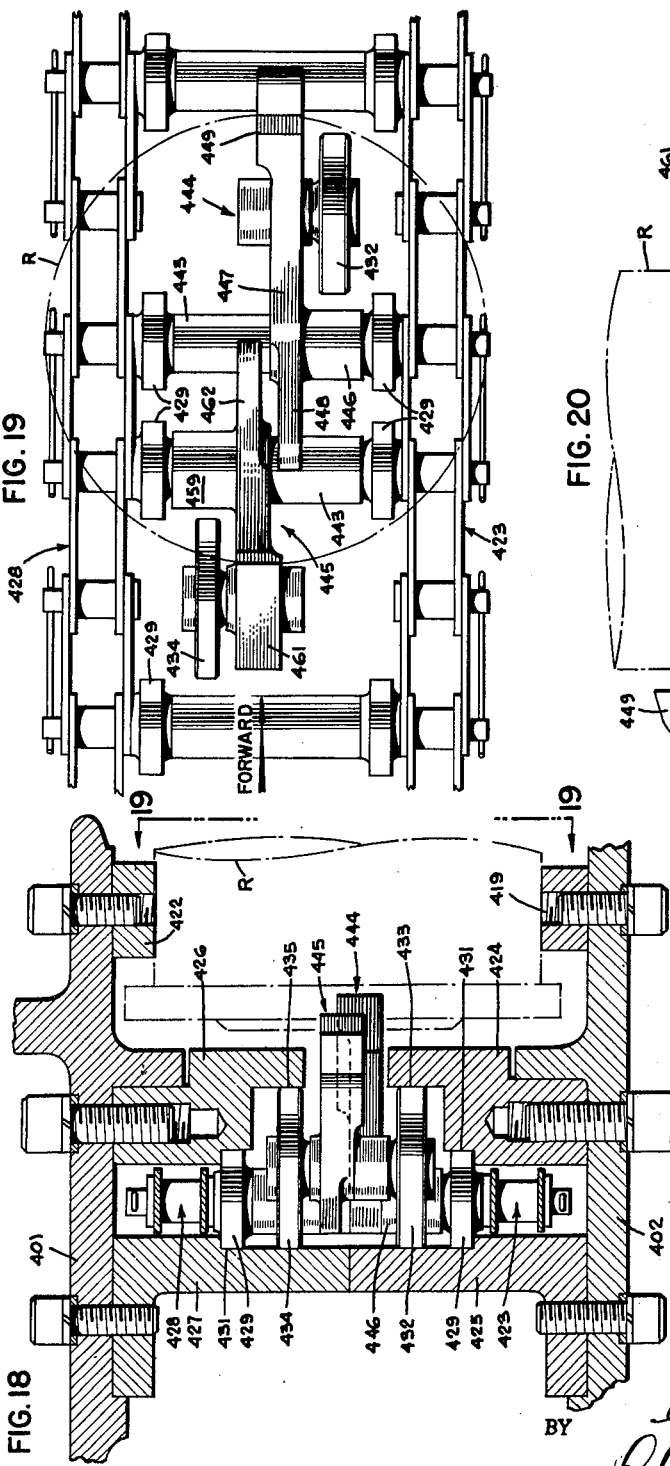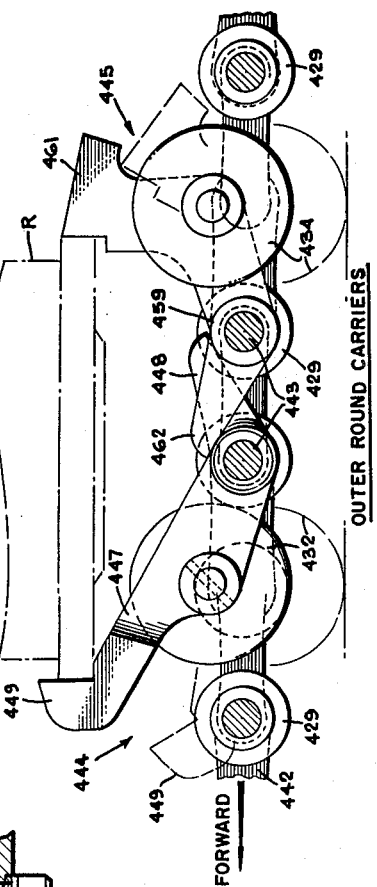

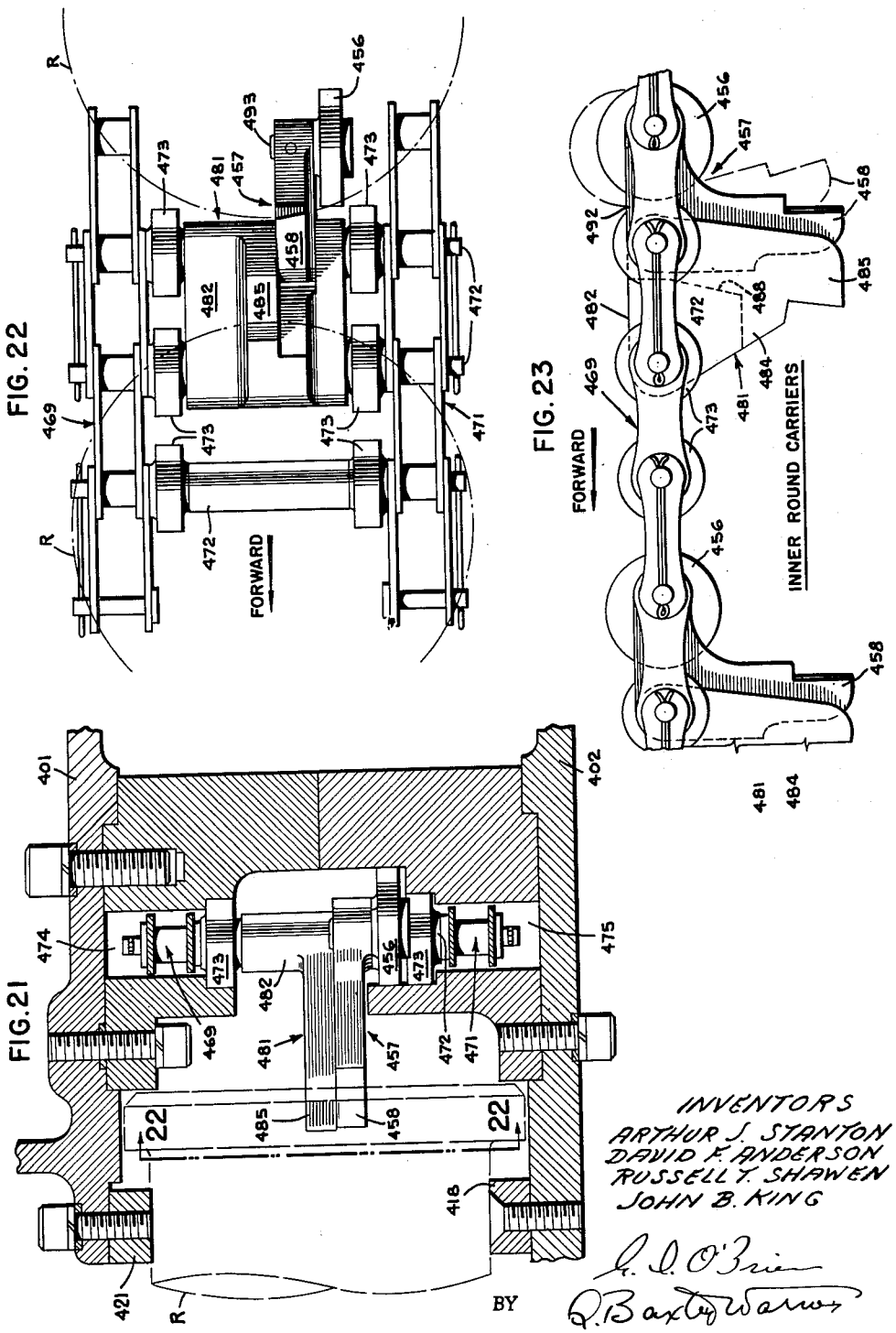

Oct. 20, 1964   A. J. STANTON ETAL   3,153,368
AMMUNITION TRANSFER MECHANISM
Filed June 3, 1957   22 Sheets-Sheet 16
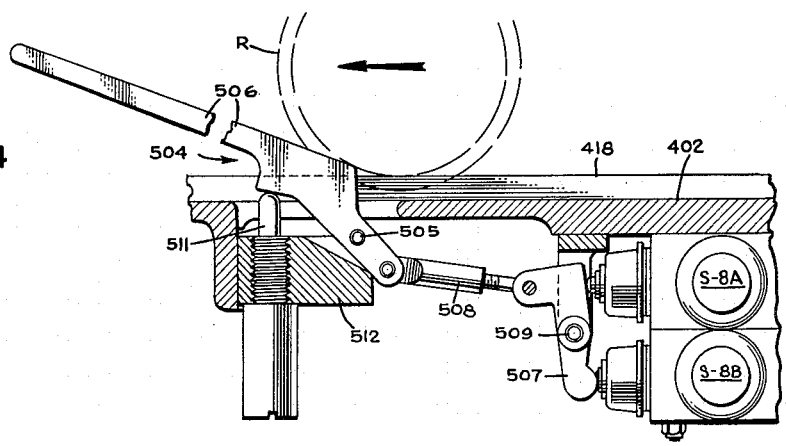
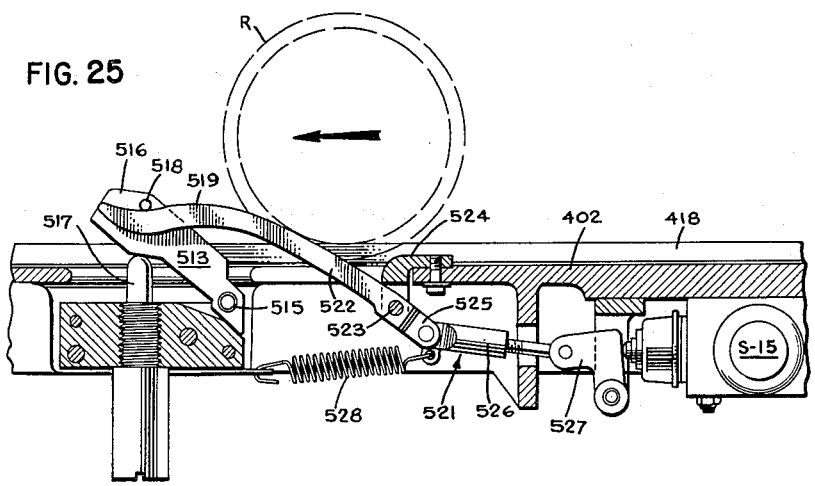
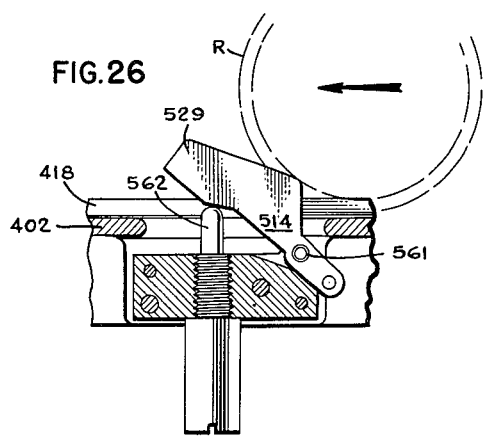
INVENTORS
ARTHUR J. STANTON
DAVID F. ANDERSON
RUSSELL T. SHAWEN
JOHN B. KING
BY
ATTORNEYS Oct. 20, 1964  A. J. STANTON ETAL  3,153,368
AMMUNITION TRANSFER MECHANISM
Filed June 3, 1957  22 Sheets-Sheet 17
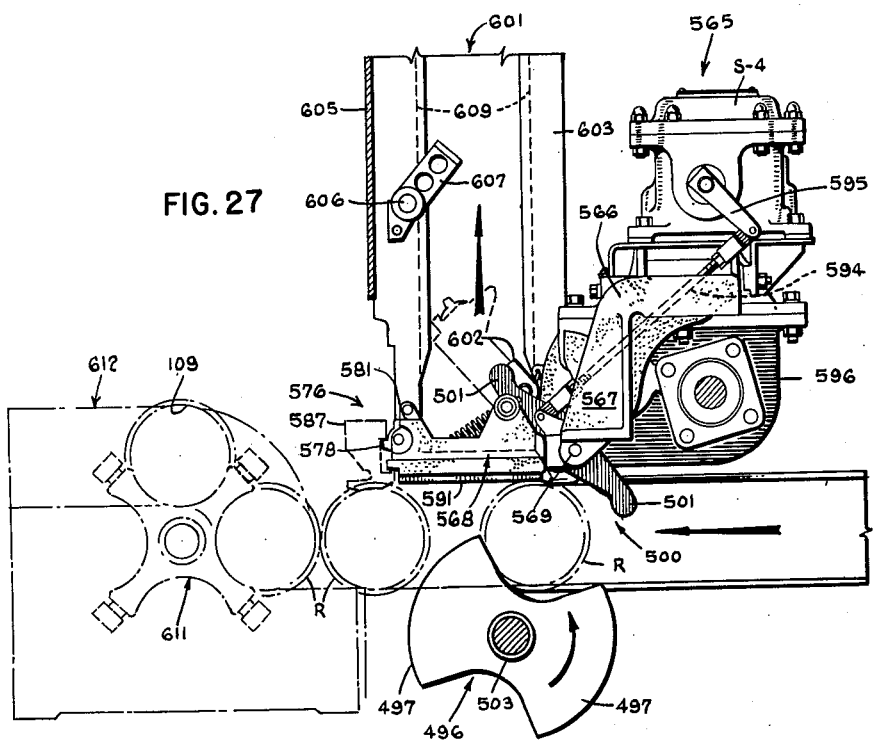
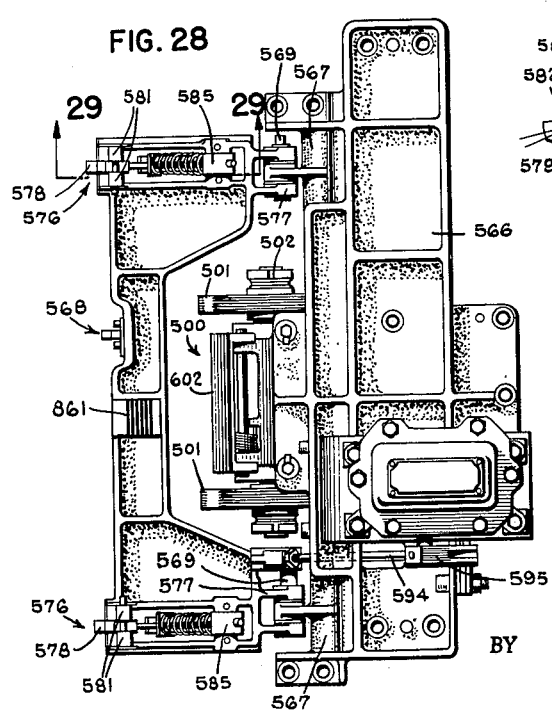
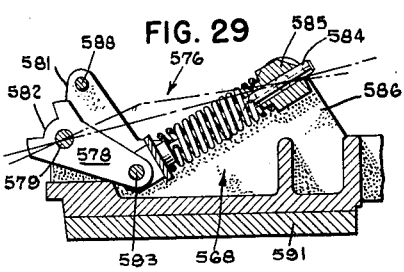
INVENTORS
ARTHUR J. STANTON
DAVID F. ANDERSON
RUSSELL T. SHAWEN
JOHN B. KING
BY
G. D. O'Brien
R. Boxter Warner
ATTORNEYS

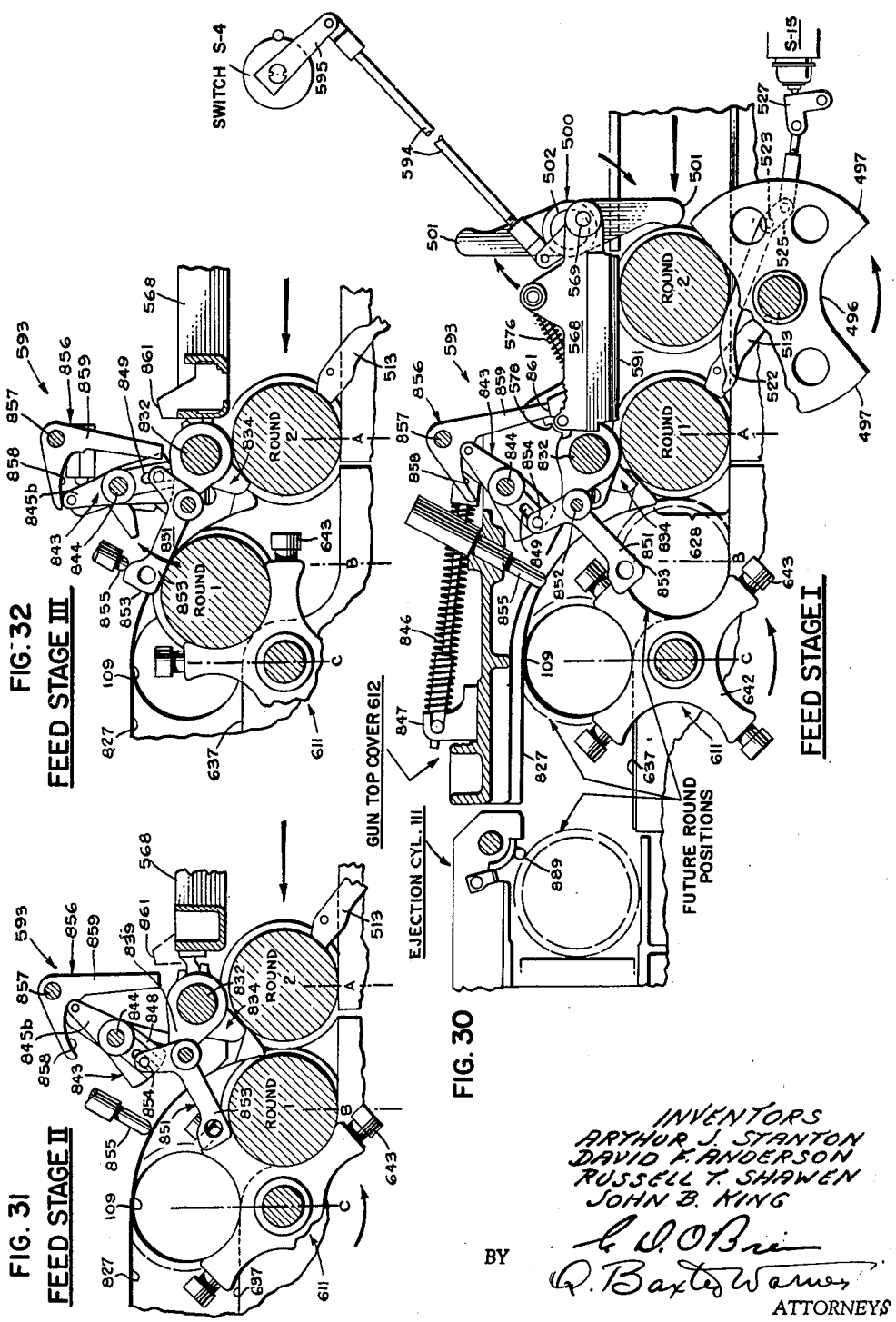

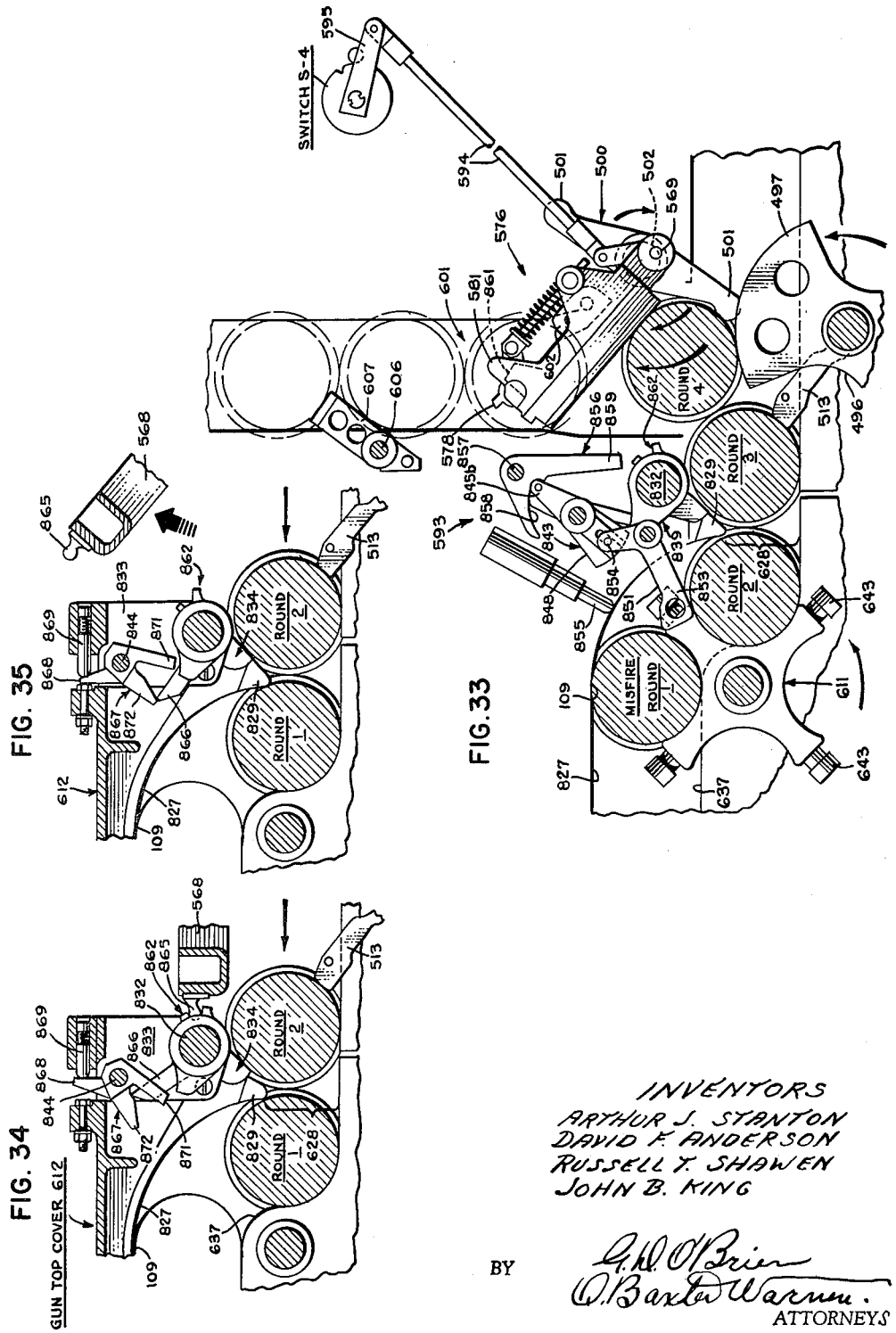

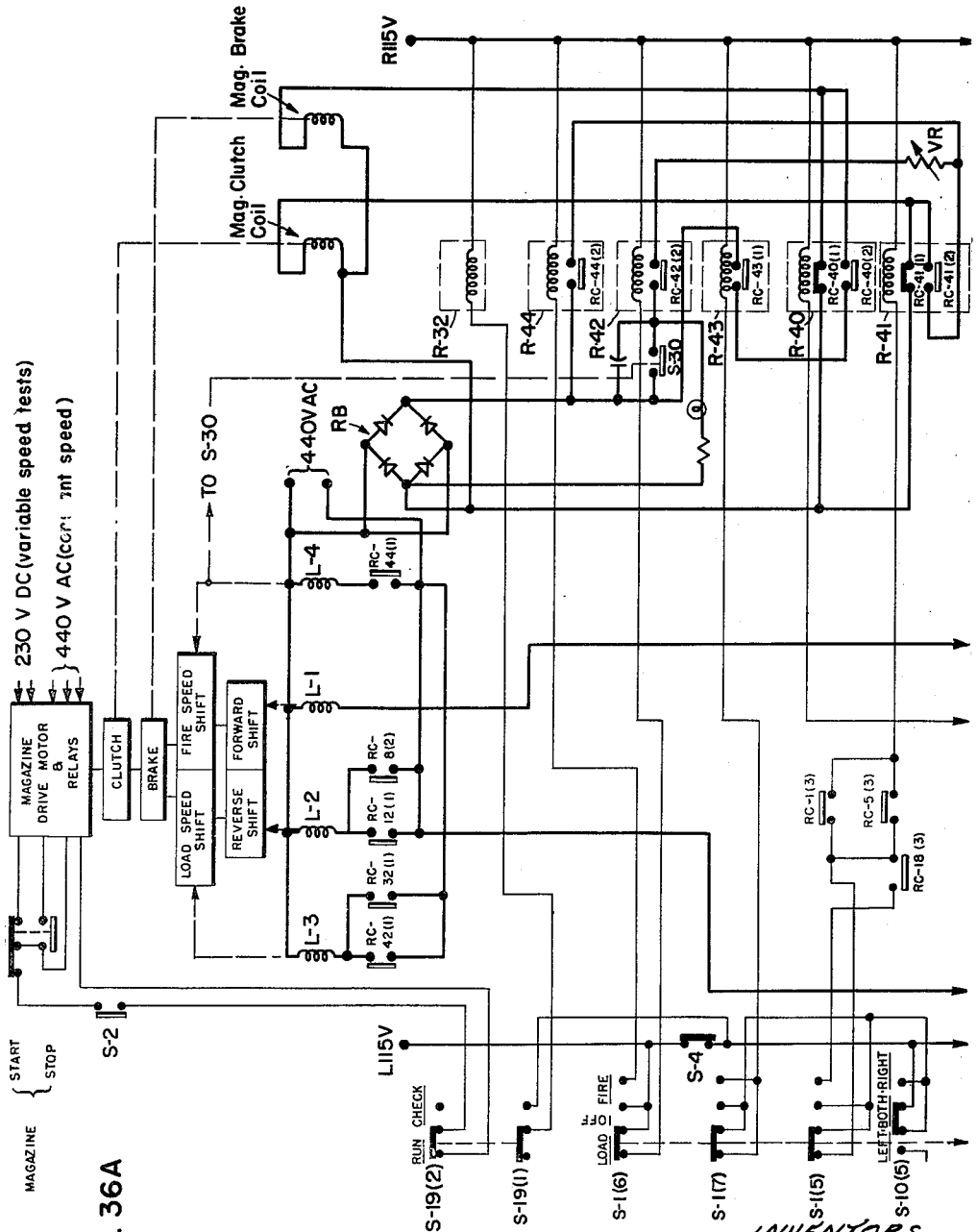

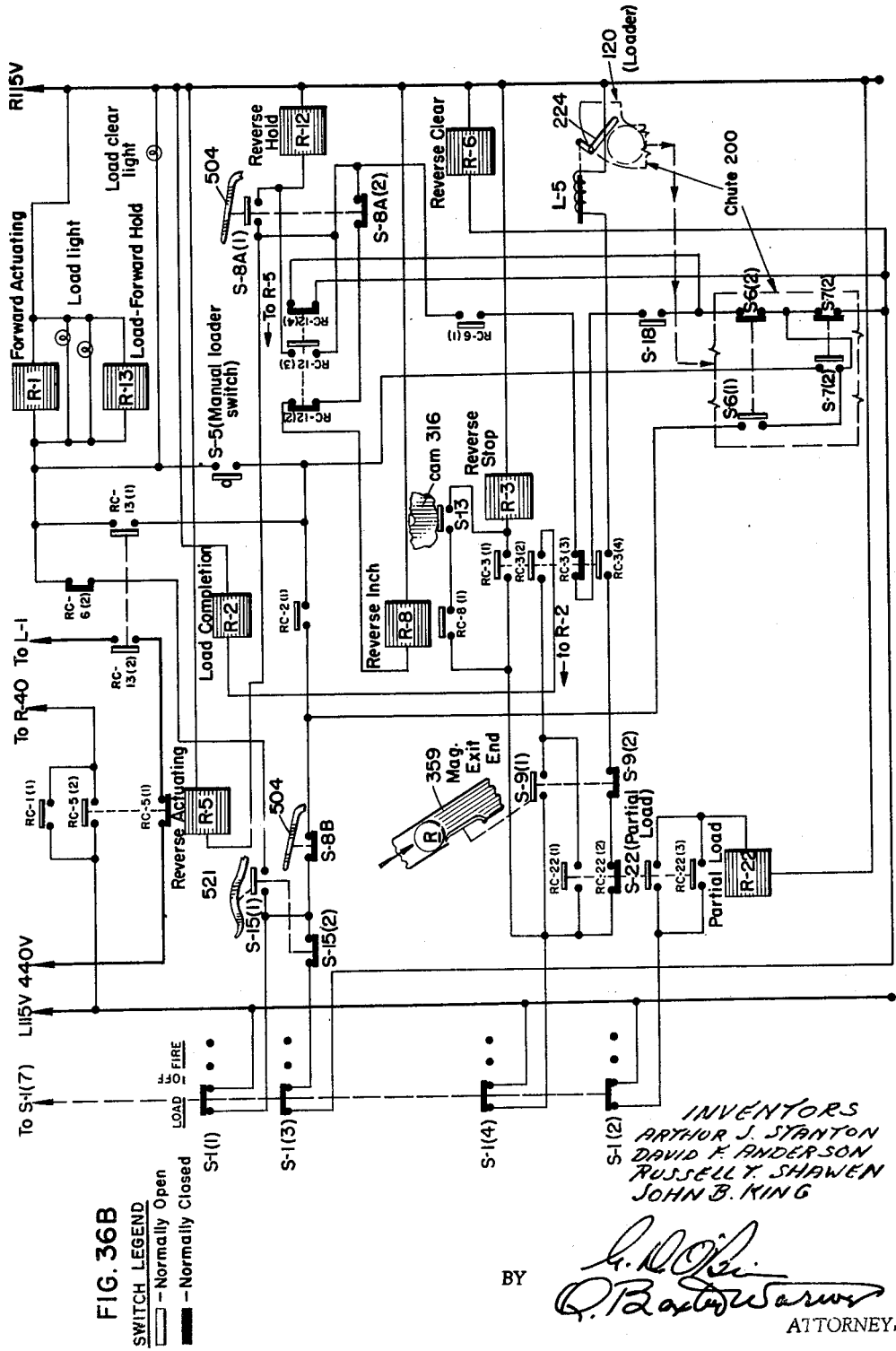

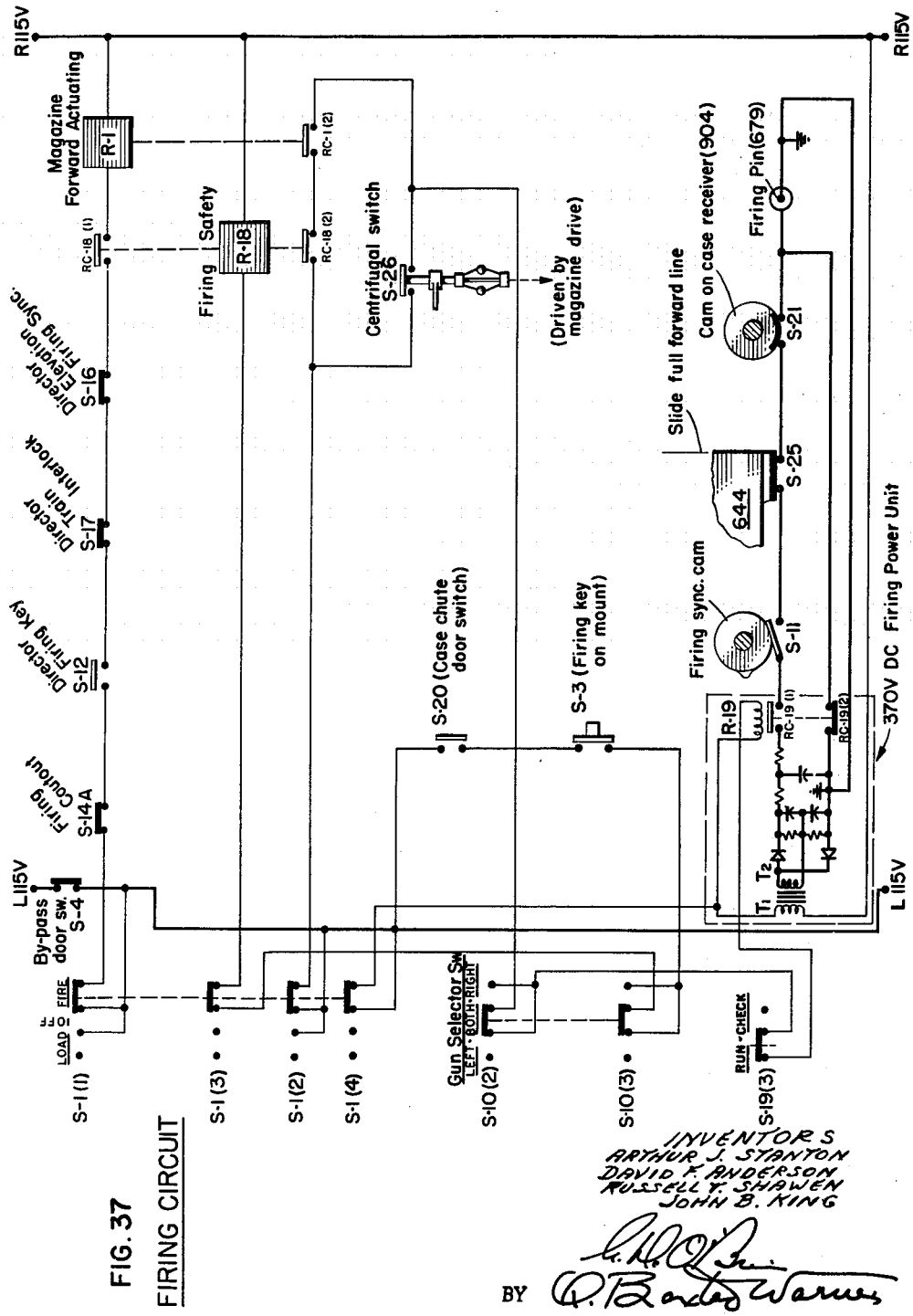
FIG. 37 FIRING CIRCUIT

////
United States Patent Office 3,153,368
Patented Oct. 20, 1964

3,153,368
AMMUNITION TRANSFER MECHANISM
Arthur J. Stanton, Bethesda, Md., David F. Anderson, McLean, and Russell T. Shawen, Arlington, Va., and John B. King, Riverside, Calif., assignors to the United States of America as represented by the Secretary of the Navy
Filed June 3, 1957, Ser. No. 663,317
5 Claims. (Cl. 89—33)
(Granted under Title 35, U.S. Code (1952), sec. 266)

The invention described herein may be manufactured and used by or for the Government of the United States of America for governmental purposes without the payment of any royalties thereon or therefor.

This application discloses and claims the magazine-to-gun round transfer mechanism which forms a portion of a complete system disclosed and claimed in copending application Serial No. 663,319, filed June 3, 1957, for Rapid-Fire Gun System.

The present invention relates to a transfer mechanism for a missile launching system which includes a high velocity, rapid fire gun and mount therefor. More particularly, this invention is directed to a mechanism which is useful for employment in a weapon system capable of producing a saturation zone type of protective or assault fire and which is especially well adapted for shipboard antiaircraft use.

Heretofore, antiaircraft guns of both large and small calibers have been devised for employment against high and low altitude attacking planes. Although the large caliber guns are effective at high altitudes when properly used, these guns are generally ineffective at low altitudes and short ranges because, among other reasons, of their slow rate of fire and the more effective evasive action taken by aircraft at low altitudes. Consequently, guns generally in use against low flying aircraft have been of a small caliber and in the machine gun class in order to obtain a rapid rate of fire and cope with the evasive action of aircraft attempting to avoid the zone of fire. However, the use of armor around the vital parts of aircraft has increased considerably and it has been found that the smaller caliber guns could make a number of hits without reaching a vital part, and, therefore, the attacking aircraft would, in many cases, continue the attack.

With conventional guns, as the caliber increases, the weight of the many gun components as well as the gun itself increases greatly. Heavier structural members are needed to load and transfer ammunition. The recoil forces generated require heavier mounting and driving structures. Consequently, aboardship the number of guns that can be installed is limited by the weight factor alone. Furthermore, the handling of conventional large caliber case ammunition presents problems because of its size and weight, such ammunition not being adapted to belt or clip type feeding as used in the machine gun class weapons.

The use of large guns and mounts generally prohibits the stowage of ammunition or maintenance of magazines on the same level on which the gun is mounted because of space requirements. Thus, the ammunition stowage and handling is at a lower level, often employing three or more decks of the ship to contain all the necessary equipment. Location below decks complicates the problem of feeding and transferring ammunition to large caliber guns and necessitates the installation of elaborate ammunition hoists with associated large gains in overall weight and complexity of the ammunition handling equipment.

The present invention overcomes many of the disadvantages of the prior art transfer mechanisms in that it provides an automatic, rapid feed, lightweight, mechanism for transferring a rocket assisted projectile of relatively large caliber from a magazine to a gun or other launching device. The entire transfer mechanism is relatively small and compact as compared with those of the prior art capable of handling similar caliber and an equivalent amount of ammunition as the present invention. The present invention is particularly well adapted for handling a rocket propelled projectile enclosed in a container or case which functions as a gun breech when the projectile is fired. This type of projectile is further characterized as being fired by the ignition of a reduced powder charge within the container, and, thereafter, while within the rifle gun barrel, the rocket propellant ignites and, after leaving the muzzle end of the gun barrel, the projectile is accelerated to a velocity comparable to conventional projectiles. Machine gun rates of fire are obtained by transferring from an associated magazine rocket assisted ammunition laterally into parallel alignment with the gun barrel without the necessity of axial ramming and extracting movement as is common with conventional cased ammunition.

It is, therefore, an object of the present invention to provide an ammunition transfer mechanism capable of transferring at a high cyclic rate large caliber rocket assisted projectiles from an ammunition magazine to a gun or other missile launching apparatus.

Another object is to provide a transfer mechanism fixed to and movable with an associated gun and capable of receiving rounds from a magazine and rotating the axis of each round 90° after it leaves the magazine of the system so as to move the rounds into parallelism with the barrel of the adjacent gun or other missile launching apparatus.

Another object resides in the provision of a transfer mechanism having means for sequentially gripping rounds received from an adjacent magazine, maintaining the grip on the round during transfer motion of the latter from the magazine to a position of parallelism with the barrel of a gun and releasing the round at the end of the transfer motion.

A further object is to provide an ammunition transfer mechanism including a round bypass device in association with suitable interlocks to bypass and stow oncoming rounds at locations remote from the vicinity of an associated gun in the event of a misfire or hang fire.

An additional object of the present invention resides in the provision of an automatic rapid feed ammunition transfer mechanism including mechanical and electrical interlocks to prevent round entry into an associated gun mechanism in the event that all phases of firing conditions have not been met.

An additional object resides in the provision of an ammunition transfer mechanism capable of delivering ammunition from an associated magazine, fanwise, through an arc of 90° so as to sequentially align the longitudinal axes of the rounds parallel with that of the barrel of an adjacent gun or other missile launching apparatus.

A further purpose of the present invention is to provide an ammunition transfer mechanism which will accomplish the delivery of ammunition to a gun at any angle of elevation and train.

Another object is to provide an ammunition transfer mechanism for a rocket launching system and one which is readily removable and replaceable in the event that maintenance or other reasons require such removal and replacement.

Other objects and many of the attendant advantages of this invention will be readily appreciated as the same becomes better understood by reference to the following detailed description when considered in connection with the accompanying drawings wherein:

FIG. 6 is a perspective view of the outside of the round transfer mechanism of the present invention as viewed from the round entry end thereof;

FIG. 7 is a perspective view of the round transfer mechanism of FIG. 6 rotated substantially 90° to reveal the round exit end thereof;

FIG. 8 is a side elevational view of the round transfer mechanism illustrated as being carried on a portion of the mount with the round structure and bypass mechanism extending upwardly therefrom;

FIG. 9 is an elevation view of the round transfer mechanism as viewed from the round inlet side thereof;

FIG. 10 is a bottom plan view of the round transfer mechanism showing drive and interlock switches associated therewith the latter being actuated in accordance with round movement through the transfer mechanism;

FIG. 11 is a horizontal sectional view through the round transfer mechanism taken along a line substantially corresponding to line 11—11 of FIG. 9 and illustrating the inner and outer round-end gripping carriers and their arcuate guideways;

FIGS. 13 and 14 are enlarged vertical detail views of the juncture between an associated magazine round exit station and the transfer mechanism round entry side illustrating the lead star wheel relative positions when the disposition of the transfer mechanism corresponds to that of a gun at 0° elevation and 90° elevation, respectively;

FIGS. 15 and 16 are enlarged detail views of the transfer mechanism round exit and entry arrangements, respectively, and showing the round-gripping carriers with their associated cams;

FIG. 17 is a detailed perspective view of the inner round-gripping carriers shown assembled in FIG. 16;

FIG. 18 is a detailed vertical sectional view of a portion of the transfer case illustrating the outer round gripping carriers and the guideways therefor;

FIG. 19 is a side view of the outer chain and round-gripping carriers as viewed from a line substantially corresponding to line 19—19 of FIG. 18 but illustrated as having been removed from the case of the transfer mechanism;

FIG. 20 is an end view of the assembled outer round-gripping carriers;

FIG. 21 is a detailed vertical sectional view of a portion of the transfer case showing the inner round-gripping carriers and their guideways;

FIG. 22 is a side view of the inner chain and round-gripping carriers separated from the case of the transfer mechanism and as viewed from a line substantially corresponding to line 22—22 of FIG. 21;

FIG. 23 is an end view of the assembled inner round-gripping carriers;

FIG. 24 is a fragmentary sectional view through a portion of the transfer case near the round exit end thereof, taken along a line substantially corresponding to line 24—24 of FIG. 10 and disclosing a control switch S–8 for controlling the operation of an associated magazine;

FIG. 25 is a sectional view similar to that of FIG. 24 and taken along a line substantially corresponding to line 25—25 of FIG. 10 and illustrating a control for switch S–15 and the latch associated therewith;

FIG. 26 is a sectional view similar to that of FIG. 25 and taken along a line substantially corresponding to line 26—26 of FIG. 10 and showing a round feed control latch which is spaced from and cooperates with the latch of FIG. 25;

FIG. 27 is a side elevational view of the round by-pass door and round lifter assembly located above the round exit end of the transfer mechanism;

FIG. 28 is a view from above the round by-pass door and round lifter assembly as viewed when removed from the remainder of the transfer mechanism structure;

FIG. 29 is an enlarged sectional view through the by-pass door of FIG. 28 taken along a line substantially corresponding to line 29—29 in FIG. 28;

FIG. 30 is a schematic view of the path of a round in normal feed passing from right to left through the round exit station of the round transfer mechanism, through an associated gun mechanism and to an associated ejection station, showing the various feed and control mechanisms located in this area;

FIG. 31 is a changed position view of a portion of FIG. 30;

FIG. 32 shows a portion of FIG. 30 in a further changed position;

FIG. 33 is a schematic view of the path of succeeding rounds into the by-pass mechanism upon misfire;

FIGS. 34 and 35 are detailed views showing the by-pass door in closed or pawl resetting and open positions, respectively;

FIGS. 36A and 36B represent the electrical circuitry employed in the present invention and, as shown, illustrates the condition of the various circuits during loading and unloading of rounds into and from the magazine and transfer mechanism; and FIG. 37 represents a portion of the circuitry of FIGS. 36A and 36B and additional switches and relays required in the firing cycle.

GENERAL MOUNT DESCRIPTION

Figure 1:
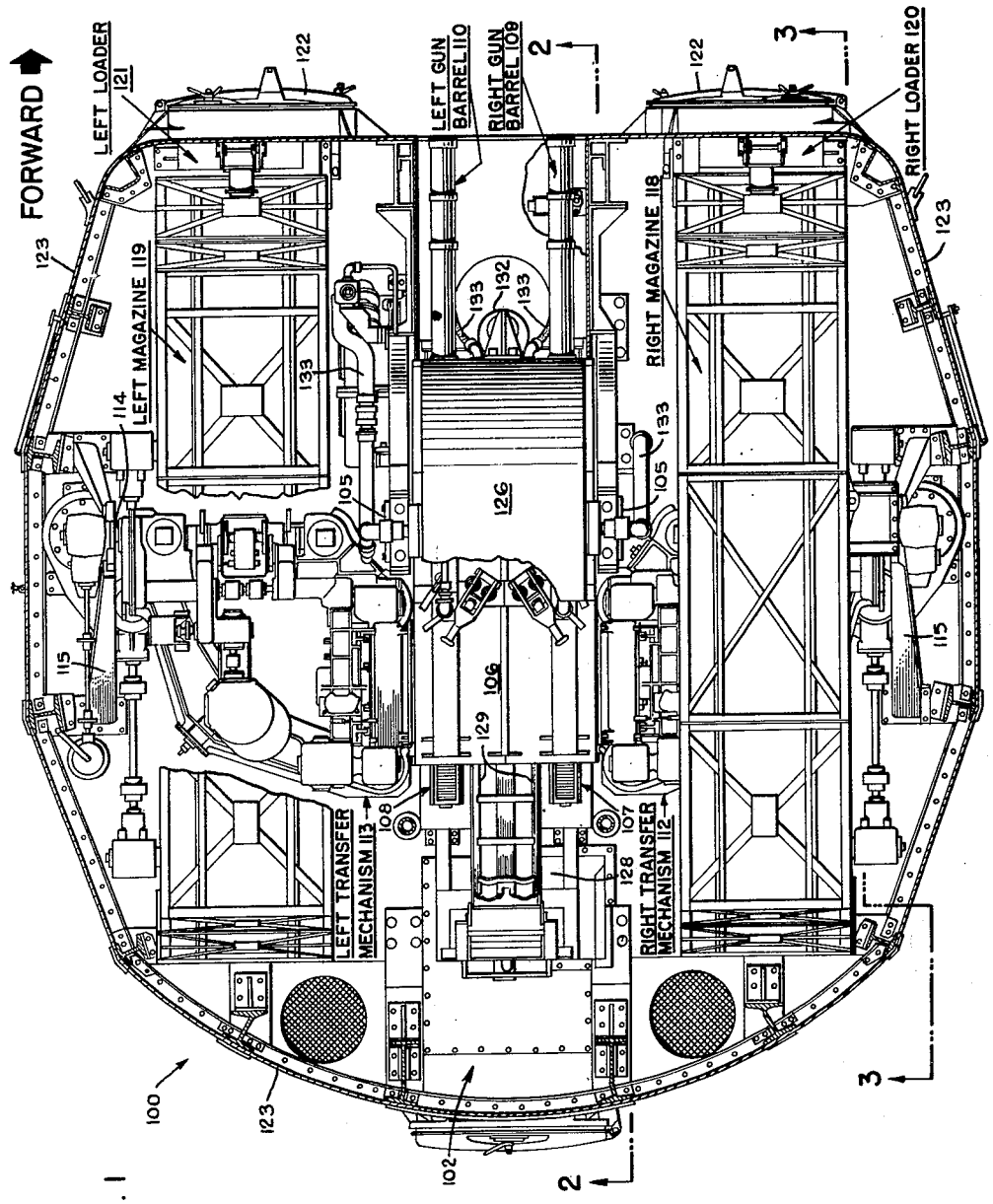
FIG. 1 is a top plan view with portions broken away of a twin mount embodying the present invention.

Referring first to FIGS. 1 through 5 which are general arrangement views of an entire system in which the transfer mechanism of the present invention is particularly well adapted for use, it will be observed that a twin weapon mount, generally designated by numeral 100, is shown mounted on a fixed stand 101 such as those which are presently in use on naval vessels. The mount comprises a platform carriage 102 which supports thereabove the gun and round handling mechanisms of which the transfer mechanism of the present invention is one sub-assembly and also carries therebeneath mount drive and power components. The carriage 102 is rotatably supported for movement in train on roller bearings (not shown) which engage a mating roller path (not shown) formed in a fixed training circle gear 103. A carriage mounted drive pinion 104 is drivingly meshed with the training circle 103 for driving the mount in train. The additional power and associated equipment such as motors, firing cutouts, brakes, clutches and buffers, carried beneath the carriage, form no part of the present invention and will not be described in detail.

Figure 2:
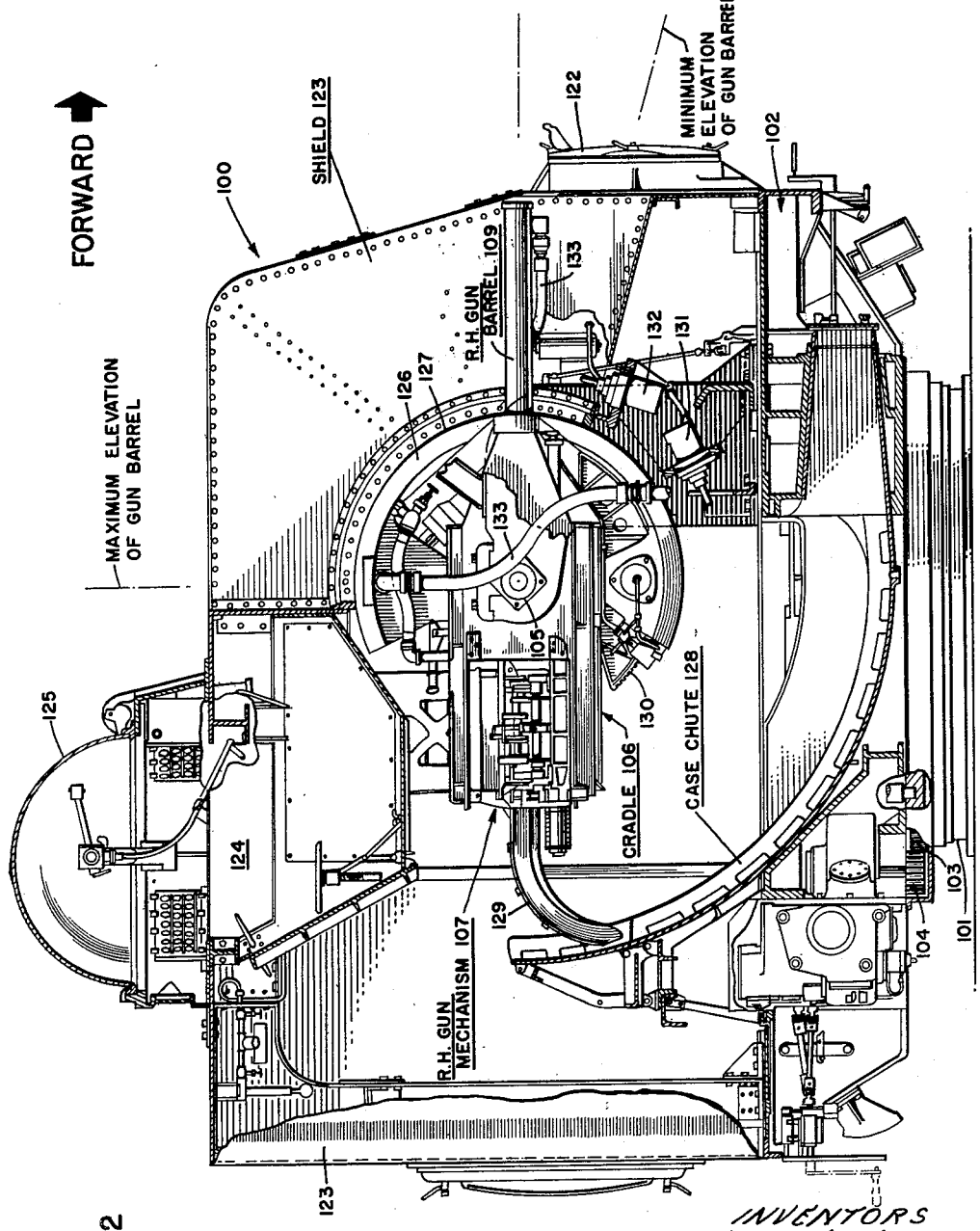
FIG. 2 is a vertical sectional view of the mount of FIG. 1 taken along a line substantially corresponding to line 2—2 of FIG. 1.
Figure 4:
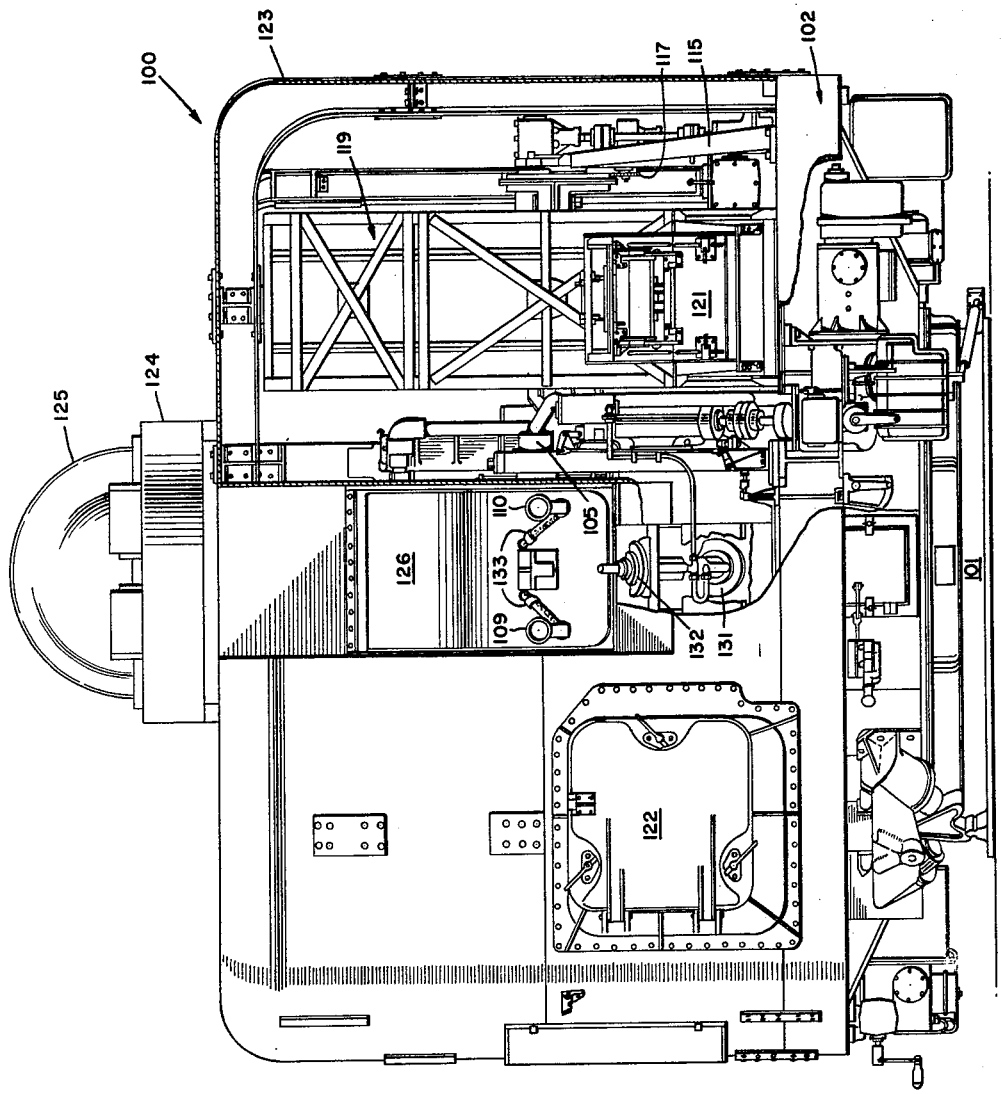
FIG. 4 is a front vertical elevational view of the gun mount of FIGS. 1, 2 and 3 with a portion of the shield broken away to better illustrate certain portions of the internal arrangement of the mount components.

Located centrally atop the carriage is a pair of trunnion bearings 105 which support therebetween, an elevatable cradle 106. An elevating arc 130 is secured to the left hand side of cradle 106, as viewed in FIG. 5, and is driven by a conventional elevating pinion (not shown) to move the entire cradle in elevation. An elevation stop buffer 131 and a depression stop buffer 132 are provided, as shown in FIGS. 2 and 4. The central portion of the cradle supports a pair of right and left hand gun mechanisms 107 and 108 each gun mechanism having a rifled barrel 109 and 110, both respectively, protruding from the front portion of the cradle. A twin case ejection system 111 is also carried by the cradle and is located between the gun mechanism. Secured to opposite sides of the cradle and elevatable therewith, are right and left hand round transfer mechanisms 112 and 113, respectively, the outer ends of which are supported in bearings 114 carried by similar right and left hand pedestals 115 secured to the top of the carriage 102. An elevation response arc 116 is also secured to the outboard ends of each round transfer mechanism and is in contact with elevation response gearing 117 connected to suitable firing cutouts during adjustment of gun elevation. Right and left hand round storage magazines 118 and 119, respectively, are mounted outboard of the cradle on the carriage and overlie the major portion of the top surfaces of each round transfer mechanism. Right and left magazine loaders 120 and 121, respectively, are mounted on the forward and lower front end of each magazine through which rounds may be fed to the magazine to load endless round carrying chains moving through each magazine. Access doors 122 permit access to the loader during periods of magazine loading and unloading.

A shield 123 secured to the carriage, completely encloses the mount units and forms a weather seal for the mount units and mount operator. The top central portion of the shield supports a control compartment 124 which includes a transparent observation dome 125 extending above the shield. A gun port shield 126 mates with a circular path 127 formed in the shield and may have inflatable waterproof sealing elements (not shown) for sealing the movable elements when in stowed condition.

A fixed case ejection chute 128, formed in the central floor portion of the carriage, is curved to conform with the sweeps of a pair of case deflector assemblies 129 carried by the afore-mentioned case ejection system 111 and delivers empty cases out the front of the mount. Suitable coolant lines 133 are employed to carry water to and from the gun barrel jacketing.

Figure 3:
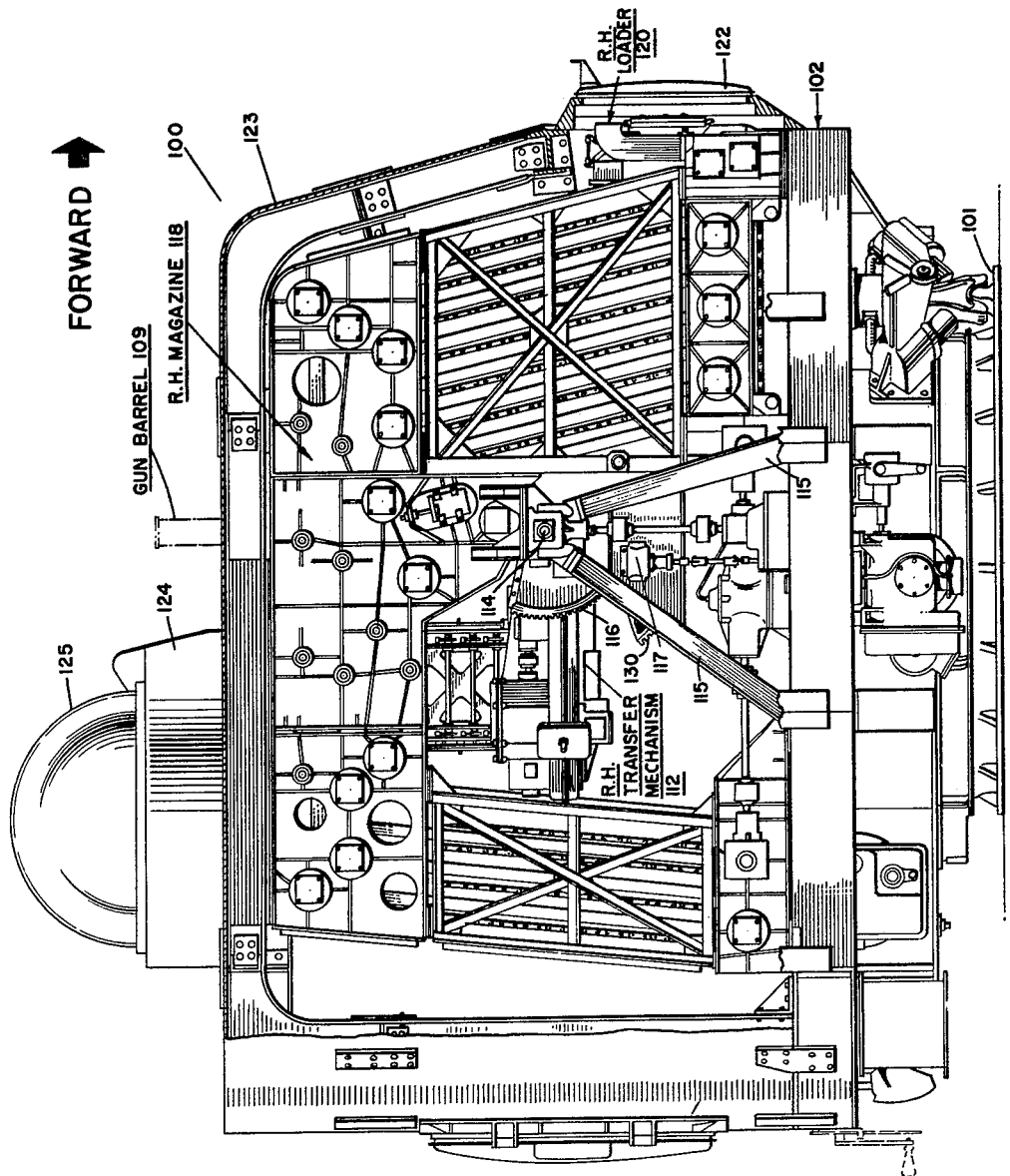
FIG. 3 is a vertical sectional view of the gun mount of FIG. 1 as viewed from a line substantially corresponding to line 3—3 of FIG. 1.

Referring now to FIG. 3, it will be apparent that the magazine power drive 377 carried on the underside of the rotatable stand 102 transmits power upwardly via shafting 378 to a combined magazine and transfer drive assembly, generally designated 379. At this point the power is split in a horizontal forward and rearward direction to similar magazine chain drive housings 381 from which power is fed to magazine chain drive sprockets. A vertical shaft 382 transmits power upwardly to the chain drive sprockets and starwheels contained within the transfer mechanism 112 of the present invention.

TRANSFER MECHANISM

Figure 5:
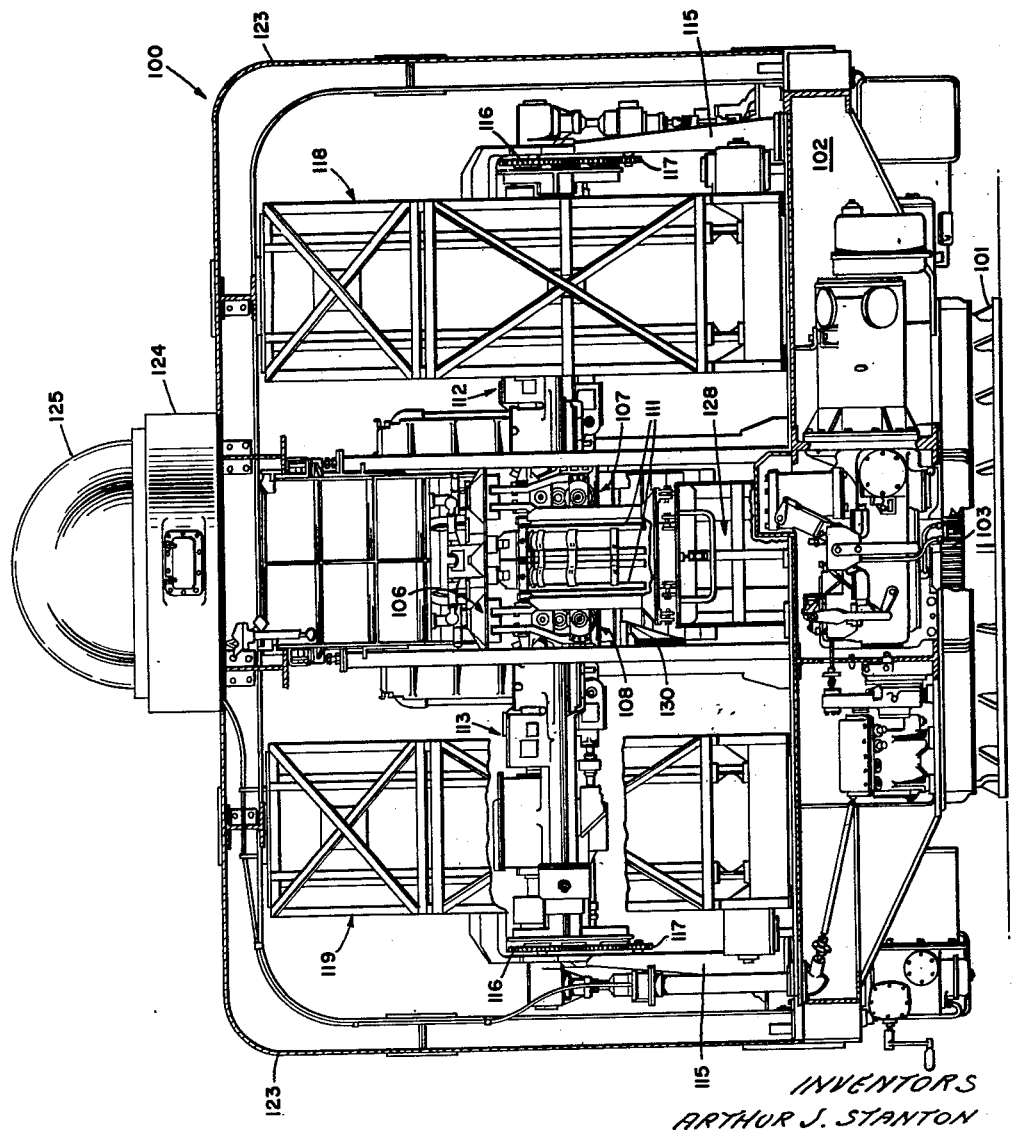
FIG. 5 is a rear vertical elevational view of the gun mount with portions of the shield and stand removed to facilitate the illustration of the arrangement of certain internal components of the mount.
Figure 12:
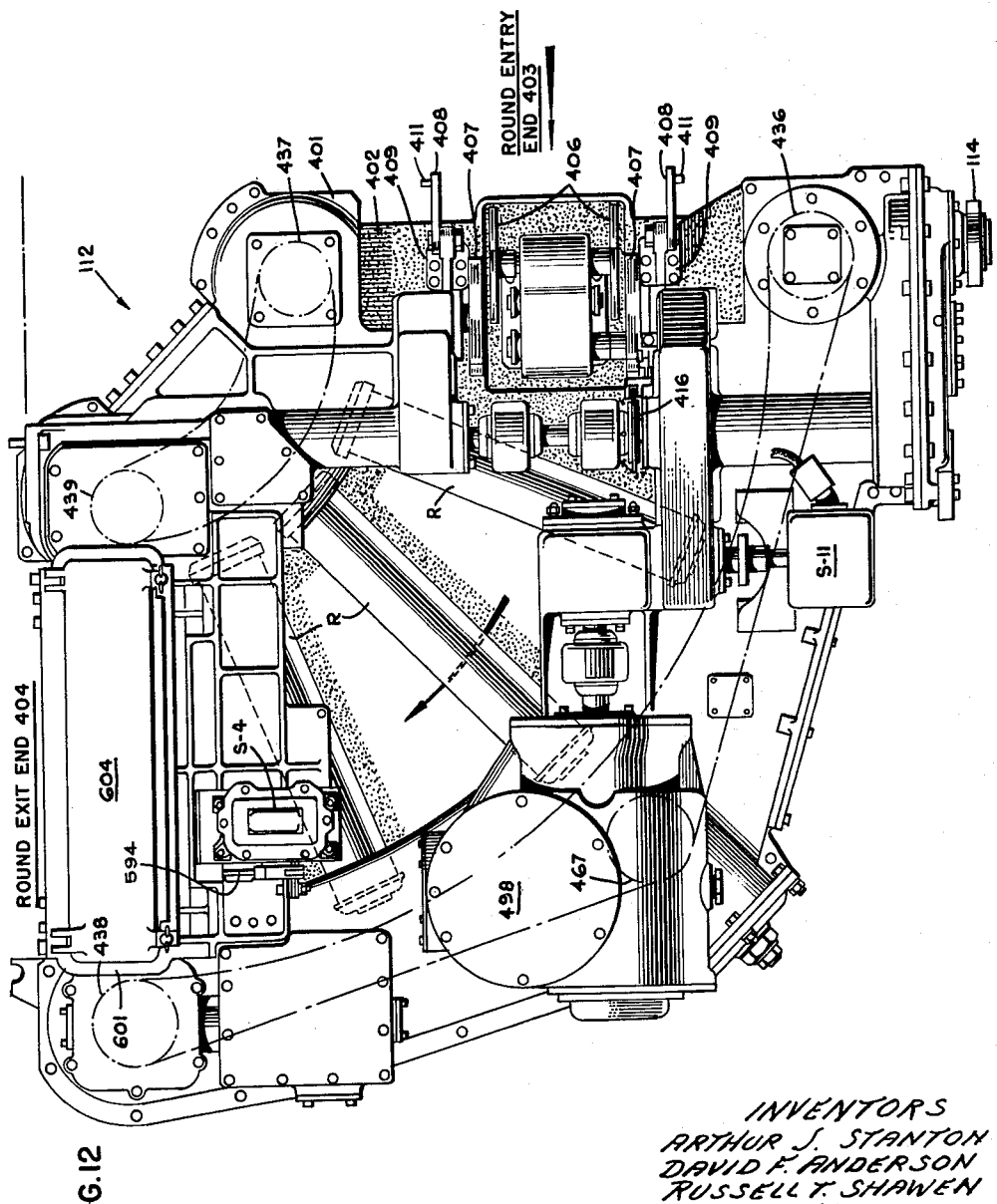
FIG. 12 is a top plan exterior view of the round transfer mechanism with rounds in place.

Referring again to the general arrangement drawings, FIGS. 1, 3 and 5, there is shown located in the opening formed by the legs of each magazine, fan shaped transfer mechanisms 112 and 113, each attached to and movable with its adjacent gun mechanism receiver. At their outer ends each transfer mechanism is supported by a pedestal or stand 115. The function of the transfer mechanism is to receive the rounds from the magazine at right angles to the normal feed of the gun mechanism and swing the base of each round through an arc of substantially 90° into a position parallel with the gun barrel axis. Details of the right hand transfer mechanism only are shown, the left hand being similar except for a reversal of parts.

Before proceeding to the detailed description of the transfer mechanism, the operation of this mechanism will be described briefly. From the round exit star wheels 353 of the associated magazine the rounds are delivered into upper and lower sets of round entry star wheels on the transfer mechanism. The rounds are then fed to a position of engagement at their outer ends with sets of round engaging carriers. These carriers are mounted on chains which travel in curved guideways formed in the upper cover and lower floor of the transfer mechanism. By these carriers the rounds are swung about an arcuate path guided by upper and lower rails and are released from the engaging carriers upon delivery adjacent round exit star wheels and a pair of lifter pawls. The lifter pawls move the rounds into a by-pass mechanism when certain conditions exist in the gun as will be more fully understood as the description proceeds. The exit star wheels move the rounds into the gun when conditions in the latter are favorable for firing. The transfer mechanism is affixed to the gun and moves in elevation therewith so that it can continually feed rounds at any angle of gun elevation. By this arrangement the round entry end of the transfer mechanism remains adjacent the magazine exit and is rotated as the gun elevates.

Referring now to FIGS. 6 through 12, the fan-shaped transfer mechanism comprises an upper cover 401 and a lower floor 402, each spaced vertically from one another to form a housing with a curved passageway having a round entry end 403 and a round exit end 404. Mounted in a recessed housing 405 adjacent the entry end 403 is a pair of lower round entry star wheels 406 which coact with a similar pair of upper round entry star wheels 407 mounted above and attached to the upper cover 401. Referring now to FIGS. 9, 13 and 14, a pair of pivoted round guide links 408 are each secured at one end to upstanding lugs 409 mounted on the floor adjacent and outboard of the lower round entry star wheels 406. These guide links have pins 411 secured to their free ends and which ride in an angled slot 356 formed in plate 355 located at the magazine round exit end 351.

From FIG. 13 it will be seen that at 0° gun elevation the links 408 form a guide extension of the round path from the magazine to the transfer mechanism and also function to hold the rounds in engagement with the star wheels. As will be apparent from a comparison of FIGS. 13 and 14 movement of the transfer mechanism, which is rigidly connected to the gun, from 0° to 90° gun elevation causes the pin 411 to move upwardly and forwardly in slot 356 thereby retracting guide links 408, the latter not being needed at 90° elevation of the gun.

Continuing to refer to FIG. 13, as each round approaches the round entry end 403 of the transfer mechanism, the round is momentarily detained to insure alignment with chain mounted round carriers, described in detail hereinafter, about to engage the round. This momentary detention of each round is effected by a detent 412 resiliently biased toward a round-engaged position by spring 410 and pivoted at one end, as at 413, to the upper cover 401 of the transfer mechanism. A stop lug (not shown) limits maximum downward travel of the detent. This detent has a round engaging medial portion 413 and a free end 414 carrying a roller 415. The roller 415 engages a multilobed cam 416, also secured to the upper cover of the transfer mechanism. Cam 416 is driven in synchronism with the round carriers, each lobe 417 of the cam momentarily preventing upward movement of the detent 412 away from the path of the round. Rotation of cam 416 sequentially moves the recesses formed between the lobes to a position opposite roller 415 thereby enabling detent 412 to swing upward under the force exerted by round pressure into a round-disengaged position thereby enabling the detained round to pass farther into the transfer mechanism.

As shown in FIG. 11, as the round is moved into the transfer mechanism, the flanged ends of the rounds are guided in paths formed by arcuate inner and outer guide rails 418 and 419, respectively, secured to the floor 402. Similar inner and outer guide rails 421 and 422, respectively, (FIGS. 18 and 21) are secured to the top cover 401 substantially in vertical alignment with the lower guide rails.

As best illustrated in FIGS. 18 and 21, the lower outer chain 423 moves between an upstanding edge 424 and a spaced flange 425 which are duplicated by corresponding inverted members 426 and 427, respectively, in the top cover 401 to provide a guide for the upper outer chain 428. Considering now the structure disclosed in FIG. 18, it will be noted that outer chain rollers 429 roll between guide surfaces 431, and the step on the inner surface of flange 425. Forward camming roller 432 rolls between cam surface 433 and the inner surface of flange 425. A rear camming roller 434 rolls between cam surface 435 and the inner surface of flange 427.

The pair of endless outer roller chains 423 and 428 move in the arcuate paths defined by the guideways formed by the afore-mentioned upstanding edges 424 and 426 and flanges 425 and 427. Chains 423 and 428 are driven by ganged sprockets. The magazine power drive is connected in any suitable manner, this not forming a part of the present invention, to selected ones or all of the outer chain sprockets 436 and 438 and the inner chain sprockets 437 and 439.

As best shown in FIGS. 19 and 20, rollers 429, afore-mentioned, are carried between the outer chains 423 and 428 and are located adjacent the inner sides of each chain. Connecting each chain 423 and 428 is a cross link shaft 443 on certain ones of which are mounted outer forward or rearward round engaging carriers 444 and 445, respectively, the forward direction being the direction of chain travel when feeding rounds to the gun mechanism.

Referring now particularly to FIGS. 18, 19 and 20 the outer forward carrier 444, pivotally carried by boss 446 on a cross shaft 443, has a forwardly and upwardly extending round engaging finger 447 at one end and a motion limit stop 448 at the other end normally in engagement with the adjacent chain cross shaft. The camming roller 432, mentioned previously, is mounted on the round carrier between a finger end 449 thereof and the point of pivotation which is at boss 446. This camming roller 432 is provided for the purpose of extending or retracting finger end 449 into or from the path of the incoming rounds.

The outer rear carrier 445 functions in a similar manner as the outer forward carrier. However, the manner in which carrier 445 functions and the structural details thereof are substantially reversed from those of carrier 444. The outer rear carrier is pivotally mounted by boss 459 on one of the cross shafts 443 and has a rearwardly and outwardly extending round engaging finger 461 at one end thereof and a finger motion limit stop 462 at the other end normally in engagement with the next adjacent cross shaft 443 in the forward direction. As afore-mentioned, the camming roller 434 is mounted on the rear round carrier 445 and intermediate the finger 461 and pivot boss 459 for coaction with appropriate cam surfaces, mentioned later, to effect extension or retraction of the finger.

The inner round carriers, while performing the same general round-gripping function of the outer carriers, differ from the outer carriers in structure and operation. The inner rear carrier, generally designated by numeral 481 (FIGS. 17 and 21 through 23) comprises a relatively broad base portion 482 secured between the upper and lower chains by means of forward and rear cross links 472, passing through apertures 483 of the base. Intermediate the longitudinal edges of the base portion 482 is a laterally extending lug 484 notched at its outer end to form a finger 485 which is adapted to engage with the end flange of a round. Adjacent the lug 484, the base 482 has a cutout portion 486 in which the forward carrier 457 is pivotally mounted on one of the cross link shafts 472 which extends through rearward apertures 483 provided in the rear carrier and the aperture 487 in the forward carrier. Forwardly of and in line with the base cutout portion 486 and integral with the lug 484 is an abutment 488 (FIG. 17) which functions as a forward motion stop for the forward carrier 457.

Continuing with the consideration of FIGS. 17, 21, 22 and 23, the inner forward carrier 457 is L-shaped in plan view and has a horizontally extending notched finger 458 arranged at substantially right angles to a line drawn between apertures 487 and 491. The pivot aperture 487 is located at the apex of the L-shaped carrier. The rearwardly extending leg 492 of the carrier is aligned with the axis of chain travel. The camming roller 456 is rotatably mounted by pin 493, FIG. 22, which is carried within aperture 491 on the rearwardmost end of leg 492. By such an arrangement provision is made for extension and retraction of finger 458 simultaneously with that of carriers 444 and 445 on the afore-mentioned outer chains.

The lower inner chain guide is provided with similar straight and curved cam portions 454 and 455, respectively, each being located opposite the corresponding cam portions 452 and 453, respectively, on the lower outer guide. Thus, it will be understood that the cam roller 456 for the inner guide forward round carrier, generally referenced by numeral 457, will be retained in retracted position during movement of the preceding round beyond the straight portion 454. Further movement of roller 456 beyond the short curve cam portion 455 causes a rapid extension of a finger 458 of the inner guide forward round carrier into gripping contact with the leading edge of the inner flange of the next round.

Although power may be applied to any or all of sprockets 436 through 439, as afore-mentioned, it will be noted that, as herein disclosed, the paired outer carrier chains 423 and 428 are driven by means of paired drive chain sprockets 438 located at the exit end of the transfer case. Referring particularly to FIG. 11 the outer chains move radially about a substantially semicircular portion 466 formed by the guideways and then are guided over a similar pair of chain sprockets 436 located on the corner adjacent to and outboard of the round entry end 403 of the transfer case. Intermediate these two sets of chain sprockets 436 and 438 and in engagement with the side of the chains returning to the round entry end is another pair of idler chain sprockes 467 having adjustable means, generally designated at 468 to maintain the desired tension on the outer chains.

Referring now to the details of the inner chain portion of the transfer mechanism, and particularly to FIGS. 11, 16, 17, and 21 through 23, there is shown a pair of vertically spaced upper and lower roller chains 469 and 471, respectively, having cross link shafts 472 on each end of which are mounted rollers 473. These chains move in arcuate upper and lower guideway 474 and 475 formed with the cover and floor portions 401 and 402, both respectively, of the transfer case by means similar to those employed for the outer chains 423 and 428, previously described. These chains 469 and 471 are driven by means of a pair of chain drive sprockets 439 mounted at the round exit end of the transfer case. The pair of chain sprockets 437 are provided at the round entry end of the transfer case to return the chains and, as disclosed herein, are idler sprockets. Intermediate these two pairs of sprockets 437 and 439 on the path of chain return to the round entry end, an additional pair of idler chain sprockets 476 is provided and includes adjusting means 477 for adjusting chain tension.

Referring now to FIGS. 11, 15, and 16, it will be noted that the direction of travel of the outer chains is counter-clockwise about a pair of round entry chain sprockets 436, previously mentioned. As a chain segment, comprising several chain elements on each of the parallel outer chains 423 and 428 progresses into the round entry end of the transfer mechanism, the forward carrier camming roller 432 of the chain segment first engages a radial portion 451 of the outer guide and on the lower portion of the transfer case. This engagement causes the forward carrier 444 to be retracted at this point. The forward camming roller 432 is next guided along a relatively straight line surface 452 the length of which is substantially equal to the width of the end of the round flange. Cam surface 452 terminates in a short reverse-curve cam portion 453 which merges with the much shallower curve of the guide proper.

The operation of the rear round carrier 445 of the outer guide portion of the transfer mechanism will now be described. As the rear carrier approaches the entry end of the transfer mechanism, the cam roller 434 first contacts a radial guide cam portion 462 (shown in phantom in FIG. 16 because it is above the plane of the paper) carried by the upper cover. This cam roller 434 causes rear carrier finger 461 to be extended at this point. The extended position of finger 461 is maintained as the camming roller 434 traverses a straight guide cam portion 460 (also shown in phantom in FIG. 16) arranged at right angles to the transfer case round entry. The rear camming roller 434 next traverses a short radium guide cam portion 463 which rapidly changes the direction of travel of roller 434 and causes the speed of travel of carrier finger 461 to be accelerated to a position of engagement with the following edge of the base flange of the entering round R.

As will be observed from an inspection of FIG. 15, as the outer guide round carriers approach the exit end of the transfer mechanism, the forward carrier cam roller 432 moves about a short radius guide cam portion 464 formed in the floor guides thereby causing the carrier to rapidly swing out of the path of the round R as the latter leaves the transfer mechanism. Simultaneously with the removal of the forward carrier from a round, the rear carrier cam roller 434 is also caused to move away from the round by moving into a recessed guide cam portion 465 (illustrated in phantom in FIG. 15) carried by the upper cover guides.

Reference now being made to FIG. 16, the operation of the inner chain carriers 457 and 481 will be described. These inner carriers travel with sprocket 437 in a clockwise direction. The cam rollers 456 on adjacent pairs of carriers first engage an arcuate cam groove 494 causing extreme separation of the forward carrier of one pair of carriers and the rearward carrier of the next succeeding pair of carriers. Upon further movement, the cam roller 456 of the first pair of carriers contacts a short, small radius cam guide portion 495 causing counterclockwise movement, with respect to the rearward carrier 481 of that pair, and retraction of the finger 458 of forward carrier 457. The finger 458 is next extended so as to be in a position approximating that assumed when the next round enters the transfer mechanism. This is accomplished by the straight cam portion 454 which corresponds in length to the time interval during which no round enters the transfer mechanism. The straight portion 454 continues and merges into the arcuate guideway 475 by means of an additional reverse-curve cam portion 455 which by coaction with cam roller 456 causes quick retraction and then extension of finger 458 into gripping contact with the leading edge of the round flange of the next round. Thus, the lower end of finger 458 is momentarily stationary, with respect to the moving chain, while cam roller 456 negotiates cam portion 455 and thereby provides proper timing of round entry into the transfer mechanism.

It will be remembered that multilobed cam 416, in cooperation with detent 412, FIGS. 13 and 14, prevents entry of a round into the transfer mechanism until a recess on cam 416 is rotated to a position permitting entry of detent 412 thereinto. By proper synchronization between the rotation of cam 416 and chain motion, a cam recess between lobes 417 will not be presented to detent 412 until inner rear carrier finger 485, as shown in FIGS. 13 and 14, and outer rear carrier finger 461 have moved into engagement with the trailing edge of the inner and outer base flanges, respectively. At this moment, the finger 458 of the inner forward carrier and the finger 449 of the forward carrier will be stationary and remain so until the round has been moved forward by the rear carriers into secured relationship with the forward carriers. At this instant, all carriers resume forward motion and move the round toward the exit end of the transfer mechanism.

It is now seen that the rounds, on being released by the pair of coacting upper and lower transfer round entry star wheels 406 and 407, are substantially simultaneously engaged by the forward and rear carriers mounted on the inner and outer chains and are smoothly carried through an arcuate path of substantially 90° to produce a corresponding angular change of round attitude. Through suitable gearing (not shown), the outer chains will move at a faster rate than the inner chains so that the longitudinal axis of each round will be at right angles at all times to the chain at its respective sets of carriers.

Reference is now made to FIG. 7 wherein it will be observed that as the round approaches the round exit end 404 of the transfer mechanism, a pair of exit star wheels 496, each having two lobes 497, receives the rounds from the carriers and propels them into the gun mechanism or toward a round bypass depending upon gun operating conditions at that particular moment. The star wheels rotate in unison and are intermittently driven by means of a roller gear cam (not shown) located in housing 498 atop the transfer case.

A pair of driven lifter pawls 500 (FIG. 27), each consisting of two identical arms 501, rotate about a pivot 502. This pivot 502 is vertically displaced in an outboard direction with respect to the lower star wheel pivot 503, and thus its relationship to the round exit feed star wheel movement is generally a following and pushing action. As viewed at the exit end (FIGS. 7 and 27), the lifter pawls are laterally displaced relative to the lower round exit star wheels. One of the lifter pawls operates between the pair of lower star wheels and the other operating outside the lower star wheels. Thus, the lifter pawls and star wheels engage the round without interference from one another.

Adjacent the exit end 404 and outboard of the lower star wheel is a central switch control arm 504 (FIGS. 7 and 24) pivotally mounted at 505 in a recess in the floor 402 of the transfer mechanism. The arm 504 comprises an elongated finger portion 506 that engages the lower rolling side of a rolling round a distance preceding and up to the approximate center of the lower star wheel. The finger portion 506 extends forwardly and upwardly at a slight angle from the floor and is in engagement with the round for a considerable distance during which time, it is retained in a depressed position substantially flush with the floor. The opposite end of arm 504 is pivotally connected to the upper end of a switch actuating bell crank 507 by means of a pivoted link 508. The bell crank 507, centrally pivoted by pin 509, engages and actuates a pair of upper and lower "First Round" switches S-8A and S-8B, respectively, that automatically stop magazine operation and cause "Load" and "Load Clear" lights on the mount captain's control panel to be extinguished. A spring actuated plunger 511, located adjacent the pivot 505 of the arm, serves to normally urge finger 506 upwardly and outwardly of the floor and into the path of oncoming rounds. An angled support 512, forming part of the plunger retaining bracket, serves to limit the maximum downward travel of finger 506.

On either side of the lower star wheel, mounted in recesses in the floor, are round operated latches 513 and 514, respectively. Referring only to the inboard latch 513 (FIGS. 7 and 25) which is pivotally mounted at 515 below the level of the floor 402, it will be observed that the latch comprises an upwardly and outwardly extending, relatively short finger portion 516 that frictionally engages the lower rolling surface at one end of each oncoming round at the time the round passes over a recess in the lower feed star wheel 496. The round is in contact with the latch and the star wheel at the same moment, thereby effecting a deceleration of the round and a more positive contact between the round and the star wheel. A spring actuated plunger 517, located below the latch 513 and adjacent the pivot 515, bears against the lower side of the finger and normally biases it into the path of the oncoming rounds. The outer end of the latch finger carries a pin 518 which engages an arm end 519 of an additional switch linkage, generally designated by numeral 521. The linkage 521 comprises an elongated curved arm 522 pivoted at 523 to a support bracket 524 on the lower transfer case floor 402, the free end of the arm engaging the pin 518, as afore-mentioned. The opposite end 525 of the curved arm is pivotally connected to an adjustable link 526 which operates a "Reverse Clear" switch S–15 through the medium of bell crank 527. The switch S–15 is operatively connected in the drive circuit to prohibit reversal of the transfer drive mechanism during the time interval of round movement over the curved arm 522. A spring 528 secured to the curved arm and a nearby wall of the transfer case biases the curved arm upwardly and into contact with pin 518.

The latch 514 (FIGS. 7, 26 and 30) comprises the same structural details as that of latch 513 except that there are no switch connections or linkages. The latch 514 comprises an upwardly and outwardly extending finger portion 529 pivoted at 561 below the level of the floor 402. A spring biased plunger 562 normally urges the finger into contact with the rolling round. The latch 514 is laterally aligned with latch 513, both serving to operate in unison to decelerate, align and retain rounds at this critical control point for further movement into the gun mechanism. Thus, as shown in FIG. 30, rebound of round 1 against the next succeeding round 2 is prevented.

BYPASS AND LIFTER ASSEMBLY

The rounds are fed from the transfer mechanism to the gun mechanism at high rates of feed. Thus, in the event of a misfire, the gun feed mechanism would come to an instant halt and by the time the magazine and transfer drive inertia could be overcome, a series of rounds would normally have been fed into the area adjacent the entry of the gun mechanism. It will be apparent that such an occurrence would cause round jamming and substantially contribute to the breakage of parts. To compensate for round misfire, hangfire and jamming, a round bypass is provided to receive such a series of rounds which are lifted through a normally closed door, which forms an extension of the upper guide rails of the transfer mechanism.

Referring generally to FIGS. 1, 3, 4 and 5, and more particularly to FIGS. 7, 12 and 27 through 29, it will be noted that a bypass door and lifter mechanism, generally designated by numeral 565 is mounted above and adjacent the exit end of the transfer mechanism. Broadly, the mechanism comprises a support bracket having a pivoted door and a pair of rotatable lifter pawls, the door being operatively connected to a transfer drive cutout switch, as will more fully appear hereinafter.

A U-shaped bracket 566 is supported by a pair of upstanding legs 567 rigidly secured to the upper portion of the transfer mechanism adjacent the vertical side walls of the transfer mechanism round exit station 404. A relatively flat U-shaped door 568 (FIG. 28), normally aligned in a horizontal plane and functioning as a forward extension of the inner and outer upper round guide rails 421 and 422 of the transfer case, is hinged at 569. In order normally to maintain the door 568 in a closed position to thereby horizontally overlie the passing rounds, a pair of overcenter spring locks, generally shown at 576 and best illustrated in FIG. 29, are provided in a plane parallel with the path of round travel and adjacent the end hinges 577 on door 568. Each lock 576 includes a locking dog lever 578 pivoted at 579 to a pair of upstanding ears 581 integrally formed with the side walls of the door. The lever 578 is notched at the forward pivot end as at 582, the other end being pivotally connected at 583 to a spring urged link 584 which is slidable in a pivoted bearing 585 formed in rearward extensions 586 of the ears 581. When the door is in a down position, the notch 582 of the lever engages a lug 587 formed on the gun top cover (FIG. 27) and at this time the lever is in the full line position of FIG. 29. The position of the link pivot 583 is below a line drawn through the lever pivot 579. In this position, pivoted bearing 585 effectively functions to prevent the door from vibrating open during cycles of round passage when a positive door lock (not shown) is intermittently moved to a non-locking position. Excessive upward pressure on the door by the rounds causes the notched lever 578 to overcome the spring tension on the link 584 thereby releasing the lever. The lever then pivots in a counterclockwise direction and abuts a stop 588 formed in the top of the pair of ears 581. On the undersurface of the door are mounted upper outer and inner guide rail extensions 591 and 592, respectively, which overlie the rounds and are spaced therefrom in such a manner as to maintain control of the rounds until they engage with one of a plurality of round engaging pawls, generally indicate at 593 (FIG. 30), and which may be considered as a gun entry door, the latter being carried by the gun top cover 612.

At the outer hinge end 567 of the door and rigidly secured to a door pivot shaft 569 is a door motion switch actuating crank 594 coupled by means of a pivotable linkage 595 to a switch S–4 mounted on the top side of the support bracket 566. The switch is connected to the magazine and transfer mechanisms' power drive and serves to initiate braking action of the magazine and transfer mechanisms upon initial opening of the door.

The round feed and lifter pawl assembly, generally designated by numeral 500, is centrally located on the underside of the bracket 566 in the U-shaped opening formed by its horizontally extending upper portion (FIG. 14). The pair of driven lifter pawls 501 are rotatably mounted at pivot 502 (FIG. 30) at the forward, lower end and outboard of a housing 596 (FIG. 7) bolted to the bracket 566. These pawls function to lift the rounds vertically beyond door 568 and into a suitable bypass chute 601, which will be later described.

Reference is now made to FIG. 33, wherein is disclosed an auxiliary, spring-biased round holding pawl 602 mounted on the forward face of the housing 596 and in between lifter pawls 501. This pawl 602 lies in the path of rounds being lifted into bypass chute 601. The holding pawl 602 constitutes one portion of a one-way retaining means and permits rounds to be moved freely upward but is spring-biased toward a fixed vertically inclined angle to prevent rounds which have entered chute 601 from dropping back down into the round exit end of the transfer mechanism.

Mounted on the side walls of the round exit end 404 of the transfer mechanism and aligned with and vertically displaced above the door 568, is the round bypass chute or guide 601 as shown in FIG. 27.

Reference will now be made to FIG. 8, wherein it will be noted that the guide 601 comprises a pair of similar, parallel spaced, upstanding legs 603 which are secured at their lower ends to the transfer mechanism side walls, the upper ends being provided with and coacting with a pivoted door 604 horizontally extending thereacross. The guide 601 is open on the outboard side and provided with a partially closed wall 605 adjacent the gun and interiorly of which are mounted a plurality of horizontally extending cross support shafts 606, each shaft carrying a pair of spring-biased pawls 607 adjacent the shaft ends. The cross shafts 606 are journaled in vertically extending L-shaped brackets 608 secured to wall 605 adjacent the interior of each leg 603. The inside face of each leg 603 is formed with a round receiving recessed guideway 609 extending substantially the full length of the leg, the guide being open at its lower end and closed at its upper end by the afore-mentioned door 604. As shown in FIG. 8, the pawls 607 are spring-biased upwardly and toward the open side of chute 601 and lie in the path of rounds moving upwardly in the guideways 609. These pawls yield upon the passage of a round thereby allowing each round to move upwardly within chute 601. As each round moves beyond a pair of pawls 607, the latter returns to a fixed position of engagement with the rounds adjacent their flanges. The pawls 607, after several rounds have moved into guideway 609, will be supporting the rounds in the chute 601 in vertical stacked alignment. Therefore, pawls 607 constitute the other portion of the one-way retaining means, previously mentioned.

Referring now to FIGS. 30 through 33, the operation of the bypass in the event of a jam or misfire will now be described. Assuming that round 1 has misfired, no operating pressure is available to move the feed sprocket assembly 611 for reasons disclosed in copending application Serial No. 663,319, afore-mentioned. Consequently, succeeding round 2 will not be advanced. Safety interlocking pawls 593 mounted in the gun cover 612 now function and effectively prevent the oncoming round 2 from entering the gun, also more fully disclosed in application Serial No. 663,319, afore-mentioned. Thus, round 2 now remains stationary at this point, the lower feed star wheel 496 having pushed it beyond its radius of action. Succeeding rounds such, for example, as round 4 will open the unlocked door 568, the rounds being guided by their flanged ends in the bypass guide 601 and urged upwardly by the feed star wheel 496 and lifter pawls 500. The rounds are now lifted a certain distance into guide 601 by the lifter pawls 500, the lowermost round in the guide temporarily being held by the auxiliary holding pawl 602. The next round entering guide 601 will push the previously lowermost round upward and will occupy the position on the holding pawl 602 previously occupied by the upwardly displaced round. This operation is repeated, the uppermost round being retained by the pawls 607 mounted in the byapss guide 601. While this sequence of operations occurs, the transfer and magazine drives decelerate, finally stopping before the bypass is filled with rounds. Rounds in the bypass may then be manually removed by unlatching the closure door 604 and lifting the rounds over pawls 607.

Reference now being made to FIGS. 30 through 33, the structure of the bypass door locking mechanism will be described. Each time the gate pawl 834 on the top cover of the associated gun mechanism permits round entry so that rounds pass from position A to position B by pressure of succeeding rounds from the transfer mechanism, it is desired to have the bypass door 568 locked in the down position, as illustrated in FIG. 30. If a round is in transit from position B to position C and the gate pawl 834 is locked, it is then desired to allow the bypass door 568 to open. Therefore, the top cover 612 of the gun also carries a positive door lock 856. This positive door lock includes a bell crank pivotally carried by stub shaft 857 mounted on the extreme top of the cover. A cam end 858 on the bell crank overlies and is actuated by the upper end of ear 845b of pawl lock 843. The door lock is also provided with depending arm 859 which engages a stop block 861 mounted on the front and top end of bypass door 568.

The operation of the door lock 856 will now be described with reference to FIGS. 30 through 32. As a round approaches the end of the round path from position A to position B finger 853 moves clockwise rotating pawl lock 843 in the opposite direction, causing cam end 858 of door lock 856 to move upwardly and in a clockwise direction to thereby move arm 859 out of engagement with the door mounted stop block 861.

Once the round has passed from position B to position C, the door lock 856 is automatically reset by a reverse action of the foregoing operations.

In the event of a delay in firing, as would be caused by a misfire or hangfire, for example, a secondary lock and release arm (FIGS. 34 and 35) actuated by the opening and closing of the bypass door is provided. Describing the function of this mechanism briefly before proceeding to the detailed description thereof, it will be apparent that in the event the door does open, it will be necessary to block rounds from entering the feed sprocket 611 in the gun mechanism. Therefore, the same gate pawl 834 is utilized along with the shaft motion limit pawl 839, all afore-mentioned. Briefly, upward movement of the door 568 will rotate a release arm, the arm in turn causing a spring-biased lock, normally in unlocked position, to overlie an ear portion of the motion limit pawl 839 thereby locking the gate pawl 834 against rotation.

Proceeding now to the detailed description of the secondary door locking mechanism and referring to FIGS. 33 through 35, a secondary pawl lock release arm 862 is independently operable and rotatably secured to a longitudinally extending boss formed on gate pawl 834. This release arm 862 is located adjacent to and forward of the limit pawl 839. The outer face of the release arm is bifurcated to form a recess for receiving an actuator lug 865 which rotates release arm 862 counterclockwise for a purpose to be explained hereinafter. The opposite end 866 of release arm 862 is extended laterally and inwardly to engage a secondary motion limit pawl lock 867. The pawl lock 867 is also independently operable and rotatably mounted on shaft 844 adjacent and forwardly of the primary pawl lock 843 and has an upstanding end 868 in engagement with a spring urged plunger 869 mounted in cover 612 of the gun mechanism. The opposite end of secondary pawl lock 867 has a downwardly extending pair of lugs. One of the lugs is a lock lug 871 that overlies an ear of limit pawl 839 when the latter is in its locked position. The other lug is a control lug 872 which is engaged by end 866 of release arm 862 when the secondary pawl lock is in its cocked or uncocked position as best illustrated in FIG. 34. Thus, when rounds stop feeding due to a misfire or other delay, round stoppage occurs under the bypass door 568 and succeeding rounds exert sufficient pressure against this round to cause the door actuator lug 865 to rotate the release arm 862 in a counterclockwise direction (looking forward in FIG. 35). The end of the release arm now will ride down the inner surface of control lug 872 and lock lug 871 will move in a counterclockwise direction by action of spring plunger 869 to bear against an ear of motion limit pawl 839 to lock the gate pawl 834 in the downward position to prevent further round entry into the gun mechanism. When the gun has been cleared for firing, the bypass door is manually relatched and this will then reset the release arm 862 into holding engagement with the secondary motion limit pawl lock 867. From the foregoing, it will be apparent that primary and secondary round entry locking systems, each independent from the other, have been provided for normal and interrupted feeding cycles.

ELECTRICAL SYSTEM

Circuitry which provides for the operation of the present invention, except for the firing operation, is illustrated in FIGS. 36A and 36B.

As illustrated in FIG. 37, the power drive unit is provided with an electric induction motor, which may be of the squirrel-cage type, coupled to an output shaft via gears through magnetically operated clutch and brake mechanisms. The power drive motor may be driven by 440 volt, 60 cycle, 3 phase current. For testing purposes, 230 volt D.C. current is used. The various automatic devices for controlling the operation are operated in response to activation of circuitry later described and supplied from a 115 volt, 60 cycle, single-phase current source. Some of the 440 volt, 60 cycle power is rectified by the rectifying bridge RB for exciting the magnetic brake and clutch for the power drive.

The system operates at two speeds: (1) for firing, the magazine and transfer mechanism chains move forward at a high rate of speed such, for example, as 750 round-stations per minute and (2) for loading and reversing, the speed is greatly reduced, the chains moving at 60 round-stations per minute, for example.

The shifting fro mone speed to the other and from one direction of chain travel to the other is accomplished by interlock-controlled solenoids provided within the magazine drive unit, the latter also driving the transfer mechanism. The 440 volt A.C. solenoids L–1 through L–4 shift the drive unit into forward, reverse, load and fire speeds, respectively. The load and fire solenoids L–3 and L–4, and the forward reverse solenoids L–1 and L–3, both respectively, are paired in opposition.

The linkages of solenoids L–3 and L–4 are mechanically connected to switch S–30 to close the latter in response to energization of solenoid L–3 and to open the latter in response to energization of solenoid L–4. Thus, it will be understood that when switch S–1 is set at the FIRE position, switch S–30 will be open. When switch S–1 is set at either of the two remaining positions switch S–30 will be closed.

Switch S–30 provides means for supplying, via variable rsistor VR, a reduced current through the magnetic clutch coil so that the chains may be driven at selected speeds for testing purposes, these speeds being less than normal operating speeds. It will be noted that during the loading and testing cycles under no condition will the clutch be engaged prematurely until the shift in speed from fire speed to load speed has been completed thereby closing switch S–30. Thus, by adjusting resistor VR, the speed of rotation of the power output shaft from the clutch is reduced and the meshing of the mating teeth in the intermediate gearing between the load speed shift and the fire speed shift with either of the latter shifts is facilitated.

A push-button switch controls the operation of the drive motor, the motor running as long as the switch is maintained in a depressed condition.

By means of ganged switch S–1, a choice may be made as to gun, magazine, and transfer mechanism operation, i.e. FIRE, OFF, or LOAD.

When switch S–1 is set at the LOAD position, magazine and also transfer mechanism control circuits are cleared for the loading operation, gun control circuits (not shown) become inactive, and the magazine chain automatically positions itself to receive ammunition from the loading chute. When the magazine chain is correctly positioned, control reverts to the loader panel (not shown) until the magazine and transfer mechanisms are filled, or the partial load switch S–22 is manually closed by the mount captain, or until fire operation is commenced. When switch S–1 is set in the FIRE position, firing operation is made possible by the circuitry described hereinafter.

Switch S–10 provides means whereby a choice may be made so as to which gun will be active. Because each magazine and thus each transfer mechanism, and gun has its own control features, the guns may be fired individually or simultaneously.

Ganged switch S–19 in the CHECK position provides means for rendering the drive motor and firing circuits inactive while magazine control circuits remain at full voltage. Thus, the circuits may be checked in all phases of operation under power conditions, chain motion being effected manually by means not shown. When switch S–19 is set in the RUN position, the firing key S–3 maintains full control of the magazine and transfer mechanism.

The master controls for the several drives i.e. elevation, train, and magazine are all located in the gun captain's compartment in the top center of the mount shield. The loading team exerts a secondary influence on magazine and transfer motion by the manually operated loader switch S–5.

In loading the magazine 118 and the transfer mechanism 112, two major circuits are employed. These circuits are referred to as the "prepare to load" circuit and the "load" circuit. The "prepare to load" circuit includes four operational circuits herein designated as the "forward inch," "reverse hold," "reverse inch," and "load ready" circuits. Within the "load" circuit are circuits referred to as "normal load completion" and "emergency load completion" circuits.

Normally a partial load remains in the transfer mechanism and magazine when firing is terminated. Under such conditions the sequence of circuit activation is that described immediately succeeding. In the unusual situation in which there are no rounds in the system and it is desired to load the latter, the "reverse inch," the "load ready," the "load," and "load completion" circuits described hereinafter, are sequentially activated.

Stated differently, the sequence of circuit activation in loading may be characterized by the sequence of energization of several of the most important relays. This sequence of relay energization is as follows under normal operating conditions: (1) the forward actuating and forward hold relays R–1 and R–13, respectively; (2) the reverse clear relay R–6; (3) the reverse actuating relay R–5; (4) the reverse hold relay R–12; (5) the reverse inch relay R–8; (6) the reverse stop relay R–3; (7) the forward actuating and forward hold relays R–1 and R–13, respectively; and (8) the load completion relay R–2. In the event of an emergency during which it is desired to fire, the partial load relay R–22 is energized immediately, before the energization of the load completion relay R–2. Reference will now be made to the details of FIGS. 36A and 36B.

*"Forward Inch" Circuit*

Thus, if a partial load is in the transfer mechanism and magazine and it is desired to either unload or reload to capacity, ganged switch contacts S–1 are first set in the LOAD position. Under normal conditions, a round will be on switch linkage 521 at the round exit end of the transfer mechanism, causing the possibility of a jam. To reverse the operation of the transfer mechanism and magazine, they are first operated in the forward direction for a sufficient interval of time to move the round off linkage 521 to thereby close switch contacts S–15(2) so that the "reverse hold" circuit, described hereinafter, can be completed.

In order that the magazine transfer mechanism drive may be operated in the forward direction several circuits must be completed. The first circuit to be completed may be traced down the left side of the 115 volt line through bypass door switch contacts S–4, S–1(1), S–15(1), relay contacts RC–6(2), relays R–1 and R–13, the latter relay being in parallel with relay R–1, to the right side of the 115 volt line. Also the circuit through relay R–42 is completed as follows: from the left side of the 115 volt line through switch contacts S–1(6), relay R–42 to the right side of the 115 volt line. The energization of relay R–42 then closes the relay contacts RC–42(1) so that current may flow from one side of the 440 volt line through relay contacts RC–42(1), and the load speed shift solenoid L–3 to the other side of the 440 volt line thereby shifting the drive for the magazine and transfer mechanism into load speed. The shifting of the magazine transfer mechanism drive into forward drive is completed from one side of the 440 volt line through relay contacts RC–13(2), closed by the energization of relay R–13, the forward shift solenoid L–1 to the other side of the 440 volt line. The magazine brake relay R–40 is now energized to release the brake on the magazine drive through circuitry which will now be described. Relay R–40 is first energized from the left side of the 115 volt line through relay contacts RC–1(1), and relay R–40 to the right side of the 115 volt line. Next, relay R–43 must be energized from the left side of the 115 volt line through switch contacts S–4, S–10(5), S–1(7), and relay R–43 to the right side of the 115 volt line. Now the magazine brake coil is energized by polarized 440 volt current flowing from one side of the rectifying bridge RB through now closed relay contacts RC–43(1), RC–40(2), and the magazine brake coil to the other side of the rectifying bridge.

At this time, the magazine clutch coil must be energized. Relay R–42, previously energized during completion of load speed shift, closed relay contacts RC–42(2). The magazine clutch coil can now be energized by 440 volt current flowing from one side of the bridge RB through switch contacts S–30, relay contacts RC–42(2), resistor VR, relay contacts RC–41(2), and the magazine clutch coil to the other side of the bridge RB.

Now the continually running magazine transfer mechanism drive motor is coupled to the magazine and transfer mechanism chains and will cause the latter to run in a forward direction at load speed. This operation continuing until the first round clears switch linkage 521.

"Reverse Hold" Circuit

When the first round clears linkage 521 the "reverse hold" circuit is completed. One leg of this circuit may be traced from the left side of the 115 volt line through switch contacts S–1(1), S–15(2), S–1(3), and reverse clear relay R–6 to the right side of the 115 volt line to thereby open relay contacts RC–6(2) to break the circuit to the forward actuating relay R–1 and the load-forward hold relay R–13. Another leg of the "reverse hold" circuit may be traced from switch contacts S–1(3) through switch contacts S–7(2), S–6(2), S–18 (closed when gun elevation is within plus or minus 5° of 0° elevation), relay contacts RC–3(3), RC–6(1) now closed and reverse actuating relay R–5 to the right side of the 115 volt line to thereby energize the reverse actuating relay R–5. The completion of this circuit also closes relay contacts RC–5(2) to energize relay R–40 and release the magazine drive brake by the 440 volt circuitry mentioned hereinbefore. The third leg of the "reverse hold" circuit may be traced from relay contacts RC–6(1) through switch contacts S–8A(1) now closed by the round on switch linkage 504 at the round exit station of the transfer mechanism, and reverse hold relay R–12 to the right side of the 115 volt line.

The completion of the foregoing circuits reverses the magazine transfer mechanism drive by the opening of relay contacts RC–5(1) and the closing of the 440 volt circuit to the reverse shift solenoid L–2 through relay contacts RC–12(1) and is followed by re-energization of the brake and clutch relays R–40 and R–41, respectively, by means of the circuit from the left side of the 115 volt line through relay contacts RC–5(2) for relay R–40 and RC–5(3) for relay R–41, switch contacts S–30 being provided for relay R–41 circuitry only. The reverse operation of the drive will lock in by means of relay contacts RC–12(3) and the opening of relay contacts RC–12(2) and RC–12(4), this preventing "reverse inch" continuity and also preventing the bypass of S–6 and S–7 switches, which will be later described. The reverse motion of the transfer mechanism and magazine chains will continue to move rounds backwardly through the transfer mechanism and magazine to thereby release switch linkages 504 and 359 until the first round depresses a lever in the loader and thereby opens switch contacts S–7(2). This causes the de-energization of relay R–12 and establishes the bypass circuit, hereinbefore mentioned, around the S–6 and S–7 switches in the loader. Relays R–5 and R–6 remain energized as current is rerouted through relay contacts RC–12(4) bypassing the S–6 and S–7 switches to enable the transfer mechanism and magazine to continue operating even though switch contacts S–6(2), S–7(2) have been opened.

"Reverse Inch" Circuit

The de-energization of relay R–12 and the establishment of the bypass circuit around the S–6 and S–7 switches causes the completion of the "reverse inch" circuit, the reverse inch relay R–8 being energized through switch contacts S–8A(2) and relay contacts RC–12(2). The energization of the reverse inch relay R–8 closes relay contacts RC–8(1) in the reverse stop circuit and establishes a bypass circuit around relay contacts RC–12(1), for solenoid L–2, now open, via relay contacts RC–8(2) to thereby maintain reverse clutch engagement. The operation of the "reverse inch" circuit continues for a short interval of time until cam 316 closes switch contacts S–13 to energize reverse stop relay R–3.

"Load Ready" Circuit

The closing of switch contacts S–13 energizes the "load ready" circuit which stops the magazine transfer mechanism drive. This is accomplished by the energization of relay R–3 which causes relay contacts RC–3(3) to be opened thereby breaking the circuits to relays R–5, R–8, R–40, and R–41. The de-energization of relays R–5, R–8, R–40, and R–41 eliminates clutch torque and causes the magnetic brake to be applied to the drive. It will be appreciated that cam 316 is so formed and adjusted that the magazine chain stops in the proper position to receive rounds from the loading chute 200. The loader gate or round engaging fingers 224 which normally depend into the path of oncoming rounds are raised out of this path by the energization of solenoid L–5 through the following circuit: from the left side of the 115 volt line through switch contacts S–1(4), relay contacts RC–22(2), switch contacts S–9(2), relay contacts RC–3(4), loader gate operating solenoid L–5 to the right side of the 115 volt line leaving the magazine in "load ready" condition.

Load Circuit

The position of the first round switch contacts S–8B at the exit end of the transfer mechanism is in the closed position when there is no round on switch linkage 504. Normally open relay contacts RC–2(1) are in parallel with the normally open round-actuated switch contacts S–6(1) and in series with the normally open round-actuated switch contacts S–7(1), both of the latter switches having their actuators 232 in the loading chute 200 of the loader. It will be understood that rounds must be loaded in the loader chute to close switch contacts S–6(1) and S–7(1) and provide circuit continuity.

To load, the operator closes the manual switch S–5 whereupon the following circuit is completed: from the left side of the 115 volt power line through switch contacts S–1(1), round-actuated switch contacts S–8B, switch contacts S–6(1), switch contacts S–7(1), manual switch S–5, the forward actuating relay R–1, to the right side of the 115 volt line. The completion of the circuit just mentioned causes the power drive to be shifted into forward gear by closing 440 volt circuits to solenoid L–1, relays R–40 and R–41 through relay contacts RC–13(2), RC–1(1) and RC–1(3), respectively. The drive is locked in forward gear by means of relay contacts RC–13(1), and the now bypassed loader switch contacts S–5 may be opened. Thus, chain travel in the forward direction is initiated, this motion continuing unless the feeding of ammunition is delayed or when the ammunition in loader chute 200 has been completely loaded into the magazine either of which will cause the circuit to be broken by the opening of switch contacts S–6(1).

The loader gate 224 is lowered in response to the de-energization of solenoid L–5 which occurs when the magazine is filled and the first round passes over switch linkage 359 to open the normally closed switch contacts S–9(2) to open the circuit from the left side of the 115 volt power line through switch contacts S–1(4), partial load relay contacts RC–22(2), switch contacts S–9(2), the reverse stop relay contacts RC–3(4), loader gate solenoid L–5 to the right side of the 115 volt line.

*"Normal Load Completion" Circuit*

The first round engaging switch linkage 359 at the exit end of the magazine closes switch contacts S–9(1) to complete a circuit through relay contacts RC–3(2), closed during the "reverse inch" operation and remaining closed, to energize the load completion relay R–2, this circuit being traced as follows: from the left side of the 115 volt line through switch contacts S–1(4), switch S–9(1), relay contacts RC–3(2), load completion relay R–2 to the right side of the 115 volt line.

The closing of the load completion relay contacts RC–2(1) bypasses the loader chute switch contacts S–6(1) and S–7(1) through the following circuit: from the left side of the 115 volt power line through switch contacts S–1(1), switch contacts S–8B, load completion relay contacts RC–2(1), RC–13(1), and the forward actuating relay R–1 to the right side of the 115 volt line.

Thus, when the forward actuating relay R–1 is energized, the load-forward hold relay R–13, which is in parallel with relay R–1, is energized thereby closing relay contacts RC–13(1) and RC–13(2) to bypass switch contacts S–5 from relay contacts RC–2(1) to the relay R–1. In addition, the 440 volt drive circuit upon the closing of relay contacts RC–13(2) completes the forward clutch shifting circuit from one side of the 440 volt line through relay contacts RC–5(1), RC–13(2) and the forward shift solenoid L–1 to the opposite side of the 440 volt line.

Therefore, the drive operates in the forward direction to unload the loader chute 200 and move an equivalent number of rounds into the transfer mechanism 112 where the first round reaching the exit end of the transfer mechanism depresses switch linkage 504 to open switch contacts S–8B thereby breaking the "load" circuit from switch contacts S–1(1) through switch contacts S–8B, relay switch contacts RC–2(1), RC–13(1) through relay R–1, the "load" circuit being opened at switch contacts S–8B which de-energizes the forward actuating relay R–1.

*"Emergency Load Completion" Circuit*

If at any time during the loading operation it is desired to fire without further loading, the operator manually closes partial load switch contacts S–22 which energize partial load relay R–22 through a circuit which is traced from the left side of the 115 volt power line through switch contacts S–1(2), switch contacts S–22, partial load relay R–22 to the right side of the 115 volt line. The partial load relay R–22 locks itself in the circuit by the closure of its contacts RC–22(3) which are normally open. The closing of these contacts RC–22(3) completing a bypass circuit around manual switch contacts S–22.

The closing of relay contacts RC–22(1) establishes a bypass around switch contacts S–9(1) and energizes the load completion relay R–2 from the left side of the 115 volt line through switch contacts S–1(4), relay contacts RC–22(1), relay contacts RC–3(2), previously closed by energization of reverse stop relay R–3, load completion relay R–2 to the right side of the 115 volt line. Therefore, the normally open relay contacts RC–2(1) close and complete the circuit bypassing the loading chute switch contacts S–6(1) and S–7(1) through the circuit from the left side of the 115 volt line through switch contacts S–1(1), switch contacts S–8B, relay contacts RC–2(1), RC–13(1) (previously closed by energization of relay R–13) and forward actuating relay R–1 to the right side of the 115 volt line. The completion of this circuit allows the magazine and transfer mechanism chains to continue to operate in the forward direction until the first round opens switch contacts S–8B to break the circuit through the de-energization of forward actuating relay R–1 to thereby stop the operation of the magazine and transfer mechanism.

*"Firing" Circuit*

The ganged S–1 switch contacts are set at the FIRE Position and the ganged gun selector S–10 switches (FIG. 37) are set at BOTH, for example, if both guns are to be fired. The empty case chute door (not shown), which is located on the bottom of the mount at the lower end of the case ejection chute 128, is opened which closes switch contacts S–20. The firing key switch contacts S–3 are then manually closed to complete the primary circuit which may be traced as follows: from the left side of the 115 volt line through switch contacts S–20, S–3, S–10(3), S–1(3), and firing safety relay R–18 to the right side of the 115 volt line thereby closing relay contacts RC–18(1) and RC–18(2).

When firing by director control, it will be understood that the bypass door 568 on the transfer mechanism is normally closed and, therefore, switch contacts S–4 are closed, the firing cutout switch contacts S–14A are in the SAFE (position), i.e. none of the ship's structure is in the line of fire, the director firing key contacts S–12 are closed, and the train and elevation drive are synchronized with the director signal closing the director train interlock switch contacts S–17 and the director elevation interlock switch contacts S–16 (FIG. 37) thereby completing the circuit through relay R–1 which may be traced as follows: from the left side of the 115 volt line through switch contacts S–4, switch contacts S–1(1), switch contacts S–14A, S–12, S–17, S–16, relay contacts RC–18(1), forward actuating relay R–1 to the right side of the 115 volt line. This circuit actuates the magnetic clutch by the energization of relay R–41 (FIG. 36A) for drive 377 and releases the brake by the energization of the relay R–40 in the manner previously described. The drive now operates at "fire" speed, relay R–44 having been previously energized by ganged switch contacts S–1(6) (FIG. 36A) in the circuit from the left side of 115 volt line through swittch contacts S–1(6), relay R–44, to the right side of 115 volt line, to complete the circuit in the 440 volt drive unit through relay contacts RC–44(1) and the "fire" speed clutch solenoid L–4.

Now the firing circuit is established from the left side of the 115 volt line through switch contacts S–1(2), relay contacts RC–18(2) and RC–1(2), switch contacts S–10(2) and S–19(3), relay R–19 and transformer primary winding T₁ in the 370 volt D.C. power supply, to the right side of the 115 volt line. The completion of this circuit raises the potential of the direct current above ground potential and provides positive current to the firing synchronizing switch S–11 via now closed contacts RC–19(1) which are connected to the transformer secondary winding T₂.

The continuity will progress as the firing synchronizing switch contacts S–11 close. Switch S–11 is mounted on the top cover of the transfer mechanism and is driven by transfer mechanism gearing so synchronized as to close in response to round travel from the transfer mechanism into the gun thereby causing each round to be fired in the proper relationship with the next succeeding round in the transfer mechanism. The gun slide 644 will be released from its seared position in response to a round passing over a trigger finger in the gun to close switch contacts S–25 as the slide reaches its forward position, in a manner more fully disclosed in copending application Serial No. 663,319, afore-mentioned. The rotary case ejector switch contacts S–21 are normally closed and are opened only by a round case striking a case retaining bar in the ejection system. Switch contacts S–21 interlocks circuit action so that firing cannot take place while a case is entering the case ejector basket assembly. Therefore, the last stage of the firing circuit is completed from the 370 volt D.C. firing power unit through the interlock switches S–11, S–25, and S–21 to the firing pin of the gun and to ground. It will be understood that the current is rectified and stepped-up in the firing power unit, FIG. 37, from 115 volt A.C. to 370 volt D.C. The current supplied to the firing power unit originates in the left side of the 115 volt line and then flows through switch S-1(4), the firing power unit primary winding $T_1$ to the right side of the 115 volt line.

The drive motion closes the centrifugally operated switch contacts of S-26 which provides a secondary circuit around RC-18(2) and RC-1(2) thus maintaining firing voltage until the drive is virtually stopped. This action permits drive deceleration to take place and gun firing to continue until feed motion ceases thereby preventing an ammunition bypass from occurring.

*"Cease Firing or Magazine Deceleration" Circuit*

When it is desired to terminate firing the operator releases the firing key so as to open firing key contacts S-3 thereby breaking the circuit through relay R-18 which, in turn, opens the circuit through relay contacts RC-18(1) to relay R-1, or by opening of firing director key S-12 to directly de-energize relay R-1.

Chain and drive inertia will decrease, finally opening centrifugal switch contacts S-26 to break the last stage of the firing circuit. Thus, a few rounds will continue to be fired instead of being bypassed after the power to the drive is cut off.

SUMMARY OF OPERATION

Transfer Mechanism

The function of the transfer mechanism is to receive rounds from the magazine at right angles to the normal feed of the gun mechanism and then swing the base of each round through an arc of substantially 90° into a position such that the longitudinal axis of the round is parallel to the gun axis. The transfer mechanism is fan-shaped and is located in the opening formed by the legs of the magazine.

The rounds are delivered from the magazine exit star wheels 353 into an upper and lower set of transfer mechanism entry star wheels 407 and 406, respectively. Then the rounds are fed to a position of engagement at their outer ends with round engaging carriers secured to the transfer mechanism inner and outer chains. The transfer mechanism chains travel in curved guideways 424, 425 and 475 formed in the upper cover 401 and lower floor 402 of the transfer mechanism. The rounds are moved by these chain mounted carriers from the round entry end 403, through an arcuate path, to the exit end 404 of the transfer mechanism where the rounds are released from the carriers when they have arrived at the transfer mechanism exit star wheels 496. The pair of lifter pawls 500 which coact with the exit star wheels 496 move the rounds out of the transfer mechanism into either the gun mechanism or the bypass mechanism, as is required by operating conditions.

The transfer mechanism is secured to the gun and moves in elevation therewith so that rounds can be continually fed to the gun regardless of the angle of gun elevation. The round entry end 403 of the transfer mechanism remains adjacent to the magazine round exit station but is rotated relative thereto as the gun elevates. The pair of lower and upper transfer mechanism round entry star wheels 406 and 407, respectively, are relatively displaceable with respect to one another and function to provide a smooth feeding action from the magazine into the transfer mechanism, regardless of the angle of gun elevation.

In greater detail, as each round approaches the round entry end 403 of the transfer mechanism, the round is momentarily detained by the detent 412 to assure alignment with the chain mounted round carriers 444, 445 and 457 on the transfer mechanism chains 423, 428, 469 and 471. Detent 412 is moved from a round detaining position to a round clear position by means of multi-lobed cam 416 which is driven in synchronism with the various round carriers in the transfer mechanism. Each lobe 417 of the cam 416 momentarily prevents upward movement of the detent 412 away from the path of the round. The carriers are caused to move from a retracted or round disengaged position to an extended or round engaged position and vice versa by coaction between chain carried camming rollers and appropriate cam portions of the guideways at the entry and exit ends.

The transfer mechanism is provided with inner round carriers 457 and outer round carriers 444 and 445. Although the inner and outer round carriers perform the same general round gripping function, the inner and outer carriers differ in structure and operation. The difference in operation is caused primarily by the difference in the configuration of the cam guideways which actuate the inner carriers by means of the inner camming rollers 456 as compared with the cam guideways which actuate the outer round carriers by means of the outer camming rollers 432 and 434.

By proper synchronization between the rotation of cam 416 carried by the transfer mechanism and the motion of the chains in the transfer mechanism, a cam recess between lobes 417 of cam 416 will not be presented to detent 412 until the inner rear carrier finger 485, as shown in FIGS. 24 and 25, and the outer rear carrier finger 461 have moved into engagement with the trailing edge of the inner and outer round base flanges, respectively. At this moment, the finger 458 of the inner forward carrier, as illustrated in FIGS. 13 and 14, and the finger 449 of the outer forward carrier will be stationary relative to the chain motion by reason of the coaction between inner and outer camming rollers and the configuration of the cam guideways therefor. The fingers of the inner and outer forward carriers will remain stationary until the round has been moved forward by the inner and outer rear carriers 445 and 481 into snug engagement with the inner and outer forward carriers 457 and 444, both respectively. At the instant of snug engagement of the round between the carriers, all carriers resume forward motion and move the round toward the exit end of the transfer mechanism. Thus the rounds, upon being released by the pair of coacting upper and lower entry star wheels 406 and 407, are substantially simultaneously engaged by the forward and rear carriers mounted on the inner and outer chains of the transfer mechanism and are smoothly carried about the arcuate path defined by the transfer mechanism for at least a 90° angular change of round attitude.

As each round approaches the exit end 404 of the transfer mechanism during firing, a pair of exit star wheels 496 receives the round as the latter is released by the carriers. The exit star wheels propel the rounds into either the gun mechanism or toward a round bypass depending upon the gun operating conditions at that particular moment.

A following and pushing action is exerted on the rounds at the exit end of the transfer mechanism by a pair of driven feed and lifter pawls 500, one of these pawls being laterally displaced relative to the lower exit star wheels and operating between the latter and the other feed and lifter pawl being laterally displaced relative to the star wheels and operating outboard thereof. During loading operations, and when the magazine has been fully loaded, the first or leading round in the transfer mechanism engages a switch control arm 504 at the transfer mechanism exit end. Arm 504 actuates "first round" switches S-8A and S-8B which function to open the magazine drive circuit to stop magazine operation, the round retaining fingers 224 in the loader having been previously lowered by the actuation of switch S-9 in response to engagement by the first round leaving the magazine. During the time interval between the actuation of switch S-9 and switches S-8A and S-8B, the rounds remaining in the loader chute will be loaded into the magazine, and an equivalent number from the magazine loaded into the transfer mechanism. When the drive circuit is opened, the magazine brake is automatically applied to bring the magazine and transfer chains to a standstill. It will be understood that the speed of the chains during the loading cycle is substantially slower than during the firing cycle.

During firing, the rounds are maintained in positive contact with the exit star wheels by means of inboard and outboard latches 513 and 514, respectively, which are mounted in the floor at the exit end of the transfer mechanism. As a round rolls over latch 513, switch S-15 is actuated to prevent reverse operation of the transfer drive mechanism during the time interval of round movement over the curved arm 522 which is operatively connected with latch 513. In addition to insuring deceleration of the rounds as they make their exit from the transfer mechanism, latches 513 and 514 also function to align and retain the rounds for further movement into the gun mechanism.

Bypass and Lifter Assembly

The round bypass and lifter assembly is provided to receive rounds which would otherwise cause jamming of the gun mechanism in the event of a misfire or hangfire. As afore-mentioned, the automatic feed and control mechanism in the gun will come to an instant halt in the event of a misfire or a hangfire, but the magazine and transfer mechanisms which are operating at high rates of speed, during the firing cycle, have an inertia which cannot instantly be reduced to zero. Therefore, should a misfire occur, a series of rounds would normally be fed into the gun mechanism before the magazine and transfer drive could be brought to a standstill and thereby cause jamming and the breakage of parts. These rounds which would, in such an event, be fed into the gun mechanism are the rounds which enter the bypass chute 601.

The operation of the bypass and lifter assembly may be understood best by referring to FIGS. 30 through 33. As there shown, round 2 will not be advanced in the event that round 1 has misfired because no driving force is available to rotate the feed sprocket assembly 611, the slide of the gun mechanism not having been driven rearwardly in response to the firing of the round. Round 3 is effectively prevented from entering the gun mechanism by the safety interlocking pawls 593 mounted in the gun cover 612. Round 3 remains stationary because the lower feed star wheel 496 has pushed it beyond its radius of action. Succeeding rounds will be urged upwardly by the feed and lifter pawls 500 into the bypass guide 601 after having exerted a sufficient upward force to open door 568. The pair of overcenter spring locks 576 normally maintain the bypass door 568 in a closed or locked position. However, the bypass door is unlocked by excessive upward pressure on the door by rounds therebeneath which pressure effects a shifting of the overcenter springs to thereby disengage the latching levers 578 from the gun top cover. The round feed and lifter pawls 501 function to lift the rounds vertically beyond door 568 into the bypass chute 601. As the door reaches a fully open position, switch S-4 is actuated by suitable linkage connected to the door. Switch S-4 is connected to the transfer mechanism power drive via the magazine power drive and initiates braking action of the magazine power drive in response to the opening of the bypass door. The chain movement in the transfer mechanism is controlled by the magazine drive so that the chains in both the magazine and transfer mechanism move in synchronism, and when the brake is applied on the magazine drive the transfer mechanism chains also decrease their speed of movement.

The one-way pawls 607 are pivotally mounted in the bypass chute to permit the passage of rounds in an upward direction only, the first round into the bypass chute 601 being temporarily held in position by the auxiliary holding pawl 602. The next round entering guide 601 will push the previously lowermost round upwardly and will then occupy the position on the holding pawl previously occupied by the displaced round. This operation is repeated, the uppermost round being retained by pawls 607 mounted in the byass chute. While this sequence of operation occurs, the magazine drive and the transfer mechanism decelerate, finally coming to a standstill before the bypass is filled with rounds. The closure door 604 is provided at the upper end of the bypass chute, and the rounds in the bypass may be manually removed by opening door 604 and lifting the rounds over pawls 607.

Electrical System

Two major circuits are employed during the loading of the magazine 118 and transfer mechanism 112. These circuits are referred to as the "prepare to load" circuit and the "load" circuit. Four operational circuits are included within the "prepare to load" circuit and are designated as the "forward inch," "reverse hold," "reverse inch," and "load ready" circuits. Within the "load" circuit are circuits referred to as the "normal load completion" and "emergency load completion" circuits.

Under normal operating conditions, a partial load remains in the magazine when firing is terminated, and the sequence of relay energization during reloading is as follows: (1) the forward actuating and forward hold relays R-1 and R-13, respectively; (2) the reverse clear relay R-6; (3) the reverse actuating relay R-5; (4) the reverse hold relay R-12; (5) the reverse inch relay R-8; (6) the reverse stop relay R-3; (7) the forward actuating and forward hold relays R-1 and R-13, respectively; and (8) the load completion relay R-2. If during loading it becomes necessary to fire the weapon, the partial load relay R-22 is energized before the energization of the load completion relay R-2.

Thus, under normal conditions, when a partial load is in the magazine and transfer mechanism and it is desired to either unload or reload to capacity, ganged switch contacts S-1 are first set in the LOAD position. The magazine and transfer mechanism must first be operated in the forward direction for a sufficient interval of time to move the round which will normally be on switch linkage 521, at the round exit end of the transfer mechanism, off this switch linkage so that the "reverse hold" circuit can be completed. However, several circuits must first be completed before the magazine drive may be operated in the forward direction, the completion of the first circuit energizing the forward actuating relay R-1 and the load forward hold relay R-13. The second circuit is completed through relay R-42 to energize the latter thereby establishing current flow through the load speed shift solenoid L-3 and shifting the drive into load speed. The third circuit to be completed is through the forward shift solenoid L-1. The fourth circuit is through the magazine brake relay R-40, the completion of this circuit releasing the brake on the magazine drive. Finally, the circuit through the magazine clutch coil is completed. Upon the completion of the foregoing circuits the magazine and transfer mechanism chains are coupled to the magazine drive motor, and the chains will run in a forward direction at load speed until the first round clears switch linkage 521.

The "reverse hold" circuit is completed when the first round clears linkage 521. One leg of this circuit includes the reverse clear relay R-6 which functions to break the circuit to the forward actuating relay R-1 and the load forward hold relay R-13. Another leg of the "reverse hold" includes the reverse actuating relay R-5. The energization of relay R-5 causes the energization of relay R-40 thereby releasing the magazine drive brake, the brake having been applied when the circuit to the forward actuating relay R-1 was broken. The third leg of the "reverse hold" circuit includes the reverse hold relay R-12. Upon the completion of the "reverse hold" circuit the operation of the magazine drive is reversed in response to current flowing through the reverse shift solenoid L-2 and brake and clutch relays R-40 and R-41, respectively. The reverse operation of the magazine drive locks in and continues to move rounds backwardly through the transfer mechanism and magazine thereby releasing switch linkages 504 and 359. The reverse operation continues until the first round depresses a lever (not shown) in the loader and opens switch contacts S-7(2). This causes the de-energization of reverse hold relay R-12 and establishes a bypass circuit around switches S-6 and S-7. The reverse actuating relay R-5 and the reverse clear relay R-6 remain energized to enable the transfer mechanism and magazine to continue operation even though switch contacts S-6(2), S-7(2) have been opened.

The "reverse inch" circuit is completed when the reverse hold relay R-12 is de-energized and the bypass circuit around the S-6 and S-7 switches has been established. The "reverse inch" circuit includes the reverse inch relay R-8 which functions, upon energization, to maintain reverse clutch engagement. The operation of the magazine drive is under the influence of the "reverse inch" circuit for a short interval of time until cam 316 closes the switch contacts S-13 to energize the reverse stop relay R-3.

The "load ready" circuit, which stops the magazine drive, is energized in response to the closing of the switch contacts S-13, this being accomplished by the energization of the reverse stop relay R-3 which functions to break the circuits to relays R-5, R-8, R-40, and R-41. When the circuits to the latter four relays are broken, clutch torque is eliminated and the magazine brake is applied to the magazine drive. The energization of the reverse stop relay R-3 also causes the loader gate or round engaging fingers 224, which normally depend into the path of the oncoming rounds, to be raised out of this path in response to the energization of solenoid L-5. The magazine and transfer mechanism are now in a "load ready" condition.

When it is desired to load, the operator closes the manual switch S-5 whereupon the forward actuating relay R-1 is energized and the magazine drive is shifted into forward gear by the closing of the circuits through solenoid L-1, relay R-40 and relay R-41. Thus, chain travel in a forward direction is initiated and continued unless the feeding of ammunition is delayed by a break in the continuity of rounds passing through loader chute 200. When the first round passes under switch linkage 359 solenoid L-5 is de-energized and the loader gate 224 is lowered into the path of round travel in the loader chute to prevent further rounds from entering the loading mechanism.

A first round engaging switch linkage 359 at the exit end of the magazine causes the completion of the circuit through the load completion relay R-2 to establish a bypass circuit around the loader chute and switch contacts S-6(1) and S-7(1) through the forward actuating relay R-1 and the load forward hold relay R-13. The energization of the relay R-13 causes the completion of the forward clutch shifting circuit through the forward shift solenoid L-1, the magazine drive operating in the forward direction to unload the loader chute 200 and move an equivalent number of rounds into the transfer mechanism 112. When the first round reaches the exit end of the transfer mechanism and depresses switch linkage 504, the "load" circuit is broken thereby de-energizing the forward actuating relay R-1 to stop forward operation of the magazine drive.

If it is desired to fire the weapon during the loading operation but without further loading of the transfer mechanism and magazine, the operator manually closes the partial load switch contacts S-22 which causes the energization of the partial load relay R-22 which, in turn, causes the energization of the load completion relay R-2 which effects the establishment of a bypass circuit around the loading chute switch contacts S-6(1) and S-7(1).

The completion of this bypass circuit allows the magazine and transfer mechanism chains to continue to operate in the forward direction until the first round opens switch contacts S-8B to break the circuit through the de-energization of forward actuating relay R-1 to thereby stop the operation of the magazine.

When it is desired to fire the weapon the ganged S-1 switch contacts are set at the FIRE position and the ganged gun selector S-10 switches (FIG. 37) are set at BOTH, for example, if both guns are to be fired. The empty case chute door (not shown) is opened to close switch contacts S-20 and the firing key switch contacts S-3 are manually closed to complete the primary firing circuit through the firing safety relay R-18 which causes energization of forward actuating relay R-1. This circuit actuates the magnetic clutch by the energization of relay R-41 for the magazine drive and releases the brake by the energization of the relay R-40. The magazine drive now operates at "fire" speed, relay R-44 having been previously energized to complete the circuit in the 440 volt magazine drive unit and the "fire" speed clutch solenoid L-4. The firing circuit is now established through relay R-19, the firing synchronizing switch S-11 causing each round to be fired in the proper relationship with the next succeeding round in the transfer mechanism. The last stage of the firing circuit is completed through interlock switches S-11, S-25, and S-21 and firing pin 679 to ground. By the action of the centrifugal operated switch S-26 gun firing continues during magazine drive deceleration until the feed motion ceases thereby preventing an ammunition bypass from occurring.

To terminate firing the operator releases the firing key thereby breaking the circuit through firing safety relay R-18 which, in turn, causes the de-energization of the magazine forward actuating relay R-1. As the chain and drive inertia decreases, the centrifugal switch contacts S-26 finally open to break the last stage of the firing circuit.

Obviously many modifications and variations of the present invention are possible in the light of the above teachings. It is therefore to be understood that within the scope of the appended claims the invention may be practiced otherwise than as specifically described.

What is claimed is:

1. A round bypass and lifter assembly for receiving a series of rounds from a power driven ammunition magazine-to-gun transfer mechanism when predetermined firing conditions exist in the gun and comprising means for guiding and lifting in sequence a series of presented rounds to a position removed from the normal magazine-to-gun travel path, one-way retaining means for positively preventing downward movement of each round after the latter has been lifted and simultaneously permitting further upward movement of each round, and means for rendering the transfer mechanism inoperative when the round bypass and lifter assembly is operated.

2. The round bypass and lifter assembly of claim 1 wherein said means for guiding and lifting comprises a plurality of upstanding legs having round receiving guideways provided therein and a plurality of driven round lifter pawls for lifting rounds away from the normal magazine-to-gun travel path and into said guideways.

3. The round bypass and lifter assembly of claim 2 wherein said one-way retaining means comprises an elongated rotatably and horizontally mounted round holding pawl spring biased in a downward direction, said pawl being mounted below said guideways, a plurality of shafts longitudinally spaced along said guideways, and a plurality of round holding pawls spring biased in a downward direction and rotatably mounted on said shafts.

4. A transfer mechanism for transferring rounds to a trainable and elevatable gun from a magazine trainable with the gun, the mechanism comprising a transfer case movable with respect to the magazine and having a round entry station and a round exit station, a first feeding means mounted in proximity to the magazine round exit station, a second feeding means movable in an arcuate path with respect to first feeding means, drive means for rotating said first and second feeding means sequentially in timed relationship with respect to one another, a series of guide members pivotally secured at one end thereof to said transfer case and disposed for a sliding engagement with means carried by the magazine for effecting retraction and extension of said members in accordance with movement of the transfer case with respect to the magazine, round carrier means for sequentially engaging rounds adjacent said round entry station and for moving the rounds through an angular path of travel and releasing the rounds at a round exit station adjacent and in parallelism with the longitudinal axis of the gun, and a round exit feeding means for sequentially receiving the rounds from said carrier means and moving the rounds in translational motion into the gun regardless of gun elevation.

5. A transfer mechanism for transferring rounds to a trainable and elevatable gun from a magazine trainable with the gun, the mechanism comprising a transfer case movable with respect to the magazine and having a round entry station and a round exit station, round feeding means at said round entry station and disposed adjacent the magazine for continuously moving rounds from the magazine into the transfer mechanism in translational motion regardless of the attitude of the gun and transfer mechanism with respect to the magazine, inner carrier means movable in an inner arcuate path for sequentially engaging one end of each round passing said round feeding means, outer carrier means movable in an outer arcuate path concentric with said inner path for sequentially engaging the opposite end of each round passing said round entry feeding means, drive means for said inner and outer carrier means for effecting synchronized movement of each carrier means with respect to movement of said round entry feeding means during round travel through the mechanism, a yieldable detent having one end pivotally supported in proximity to said round entry feeding means, cam means engaging a free end of said detent for alternately locking the detent in a round obstructing position and releasing the detent from the latter position, means for driving said cam means when said carrier means are positioned in a predetermined manner with respect to each round entering the mechanism, and a round exit feeding means for sequentially receiving the rounds from said carrier means and moving the rounds in translational motion into the gun regardless of gun elevation.

References Cited in the file of this patent
UNITED STATES PATENTS

| | | |
|---|---|---|
| 2,524,132 | Naugler et al. | Oct. 3, 1950 |
| 2,592,790 | Brereton | Apr. 15, 1952 |
| 2,649,840 | Davidson | Aug. 25, 1953 |